United States Patent
Saito et al.

(10) Patent No.: US 9,331,927 B2
(45) Date of Patent: May 3, 2016

(54) COMMUNICATION SYSTEM, COMMUNICATION DEVICE, AND COMMUNICATION METHOD

(71) Applicant: FUJITSU LIMITED, Kawasaki-shi, Kanagawa (JP)

(72) Inventors: Masaaki Saito, Kawasaki (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 14/095,187

(22) Filed: Dec. 3, 2013

(65) Prior Publication Data

US 2014/0204778 A1 Jul. 24, 2014

(30) Foreign Application Priority Data

Jan. 22, 2013 (JP) ................................. 2013-009668

(51) Int. Cl.
*H04L 12/26* (2006.01)
*H04L 12/46* (2006.01)

(52) U.S. Cl.
CPC ............ *H04L 43/16* (2013.01); *H04L 12/4641* (2013.01); *H04L 43/0835* (2013.01); *H04L 43/10* (2013.01)

(58) Field of Classification Search
None
See application file for complete search history.

(56) References Cited

U.S. PATENT DOCUMENTS

| 2003/0053419 | A1* | 3/2003 | Kanazawa et al. ............ 370/252 |
| 2005/0105469 | A1* | 5/2005 | Hao ........................ H04L 43/16 370/235 |
| 2005/0286420 | A1* | 12/2005 | Kusumoto .......... H04L 12/5601 370/230 |
| 2010/0027416 | A1* | 2/2010 | Beauford ............ H04L 65/1006 370/225 |
| 2011/0158112 | A1* | 6/2011 | Finn et al. ..................... 370/252 |
| 2011/0261691 | A1* | 10/2011 | Jin et al. ........................ 370/230 |
| 2012/0331136 | A1* | 12/2012 | Kanai ............................ 709/224 |
| 2014/0204778 | A1* | 7/2014 | Saito et al. .................... 370/252 |

FOREIGN PATENT DOCUMENTS

| JP | 2003-244237 | 8/2003 |
| JP | 2004-7339 | 1/2004 |

* cited by examiner

*Primary Examiner* — Benjamin H Elliott, IV
(74) *Attorney, Agent, or Firm* — Staas & Halsey LLP

(57) ABSTRACT

A communication system includes a first communication device configured to transmit input data to a transmission path, detects a first accumulated amount of the input data, and transmit notifying data to the transmission path when the detected first accumulated amount has reached a threshold value, and a second communication device configured to receive data transmitted to the transmission path by the first communication device, detect a second accumulated amount of the received data, and output measurement information based on the detected second accumulated amount and the threshold value when having received the notifying data.

15 Claims, 25 Drawing Sheets

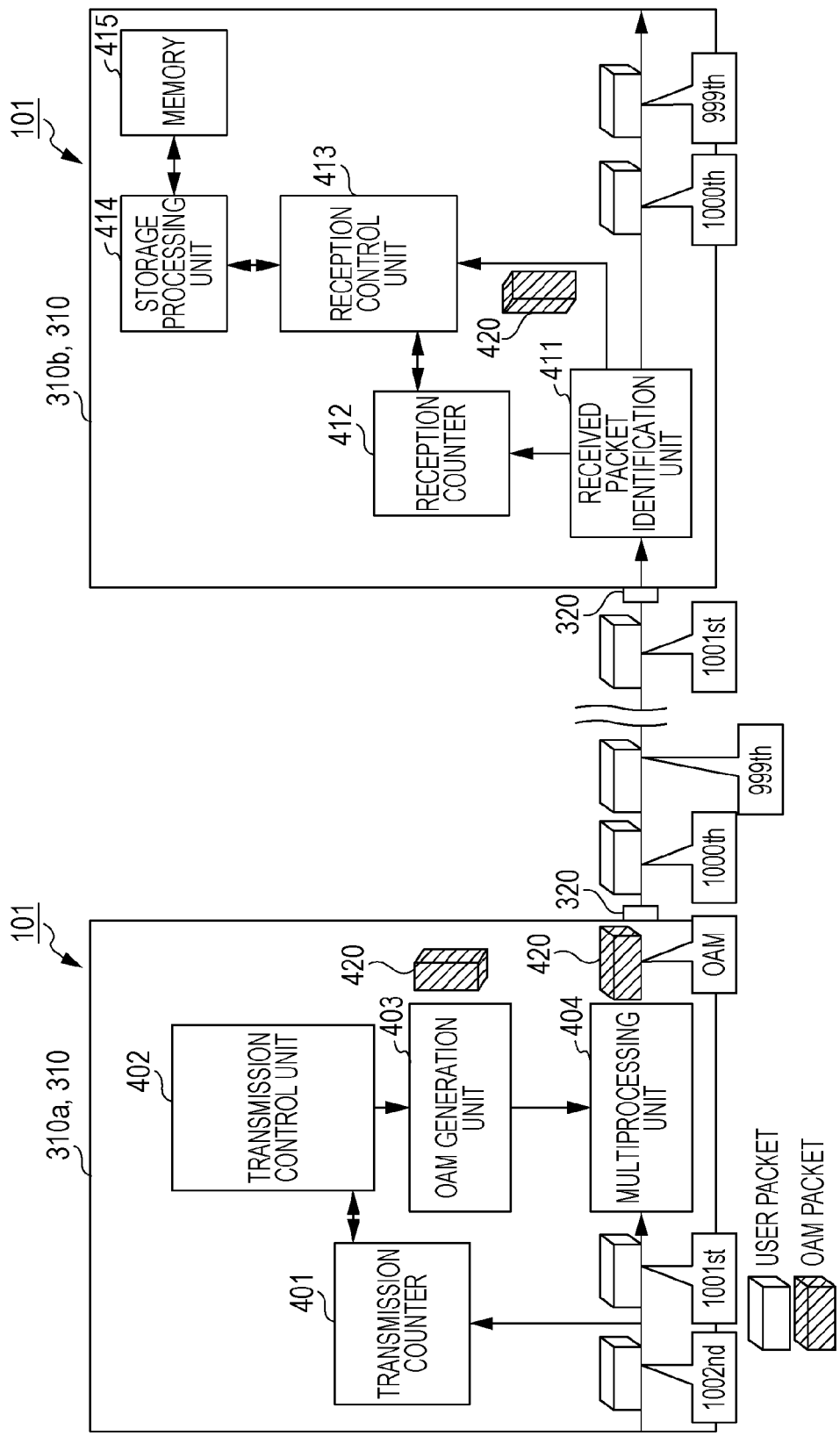

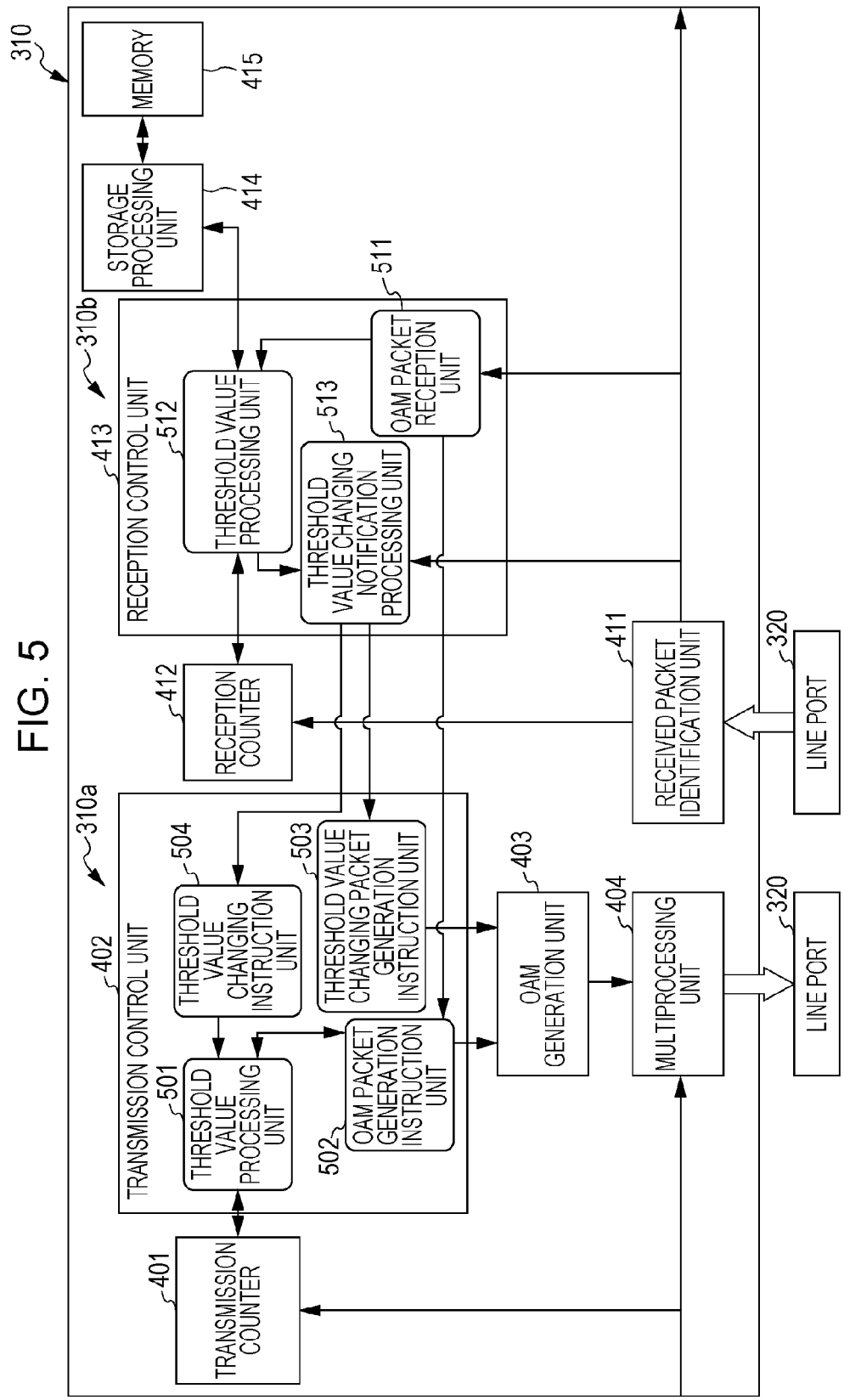

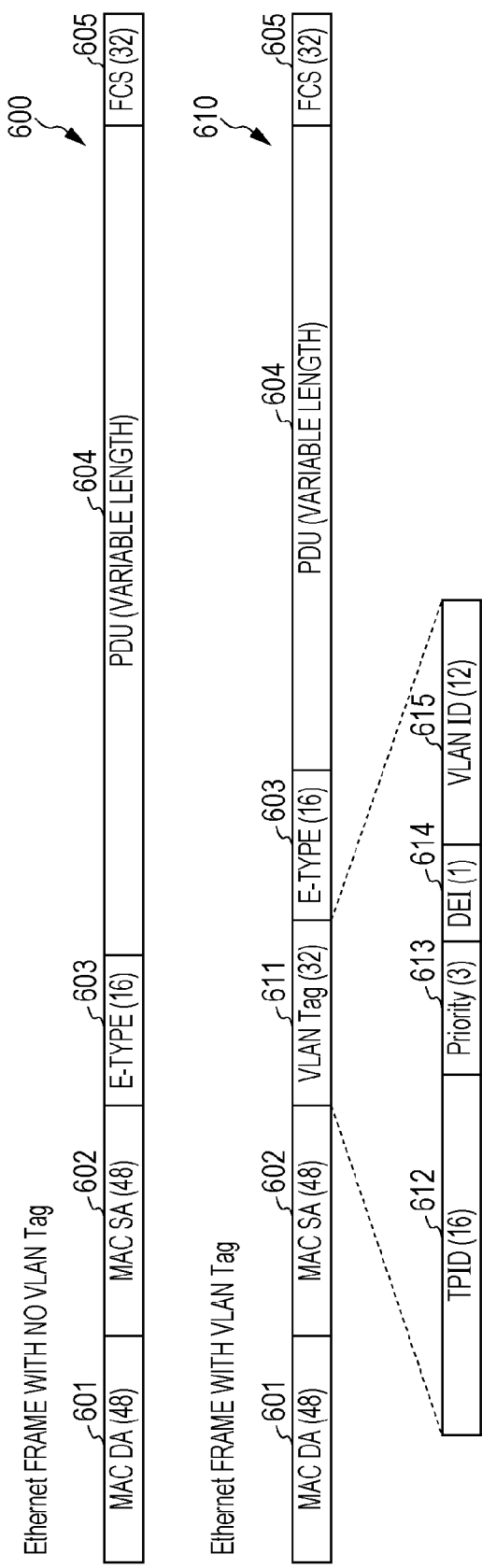

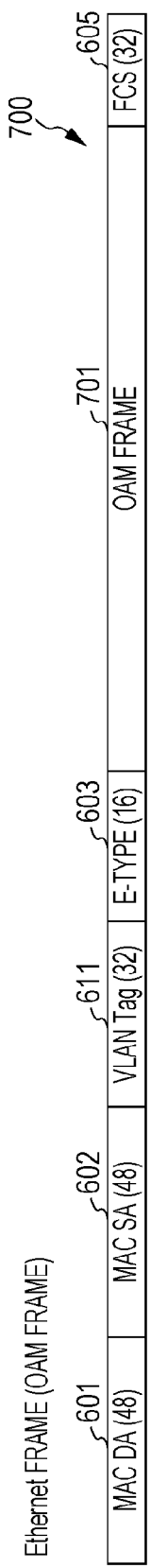

FIG. 8A

| Byte | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| Bit | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| 1 | MEL | | | Version (0) | | | | | OpCode (1SL = 53) | | | | | | | | Flags (0) | | | | | | | | TLV Offset (28) | | | | | | | |
| 5 | Source MEP ID | | | | | | | | | | | | | | | | | | | | | | | | | | | | | | | |
| 9 | [Optional TLVs start here, otherwise End TLV] | | | | | | | | | | | | | | | | | | | | | | | | | | | | | | | |
| 13 | .. | | | | | | | | | | | | | | | | | | | | | | | | | | | | | | | |
| last | End TLV (0) | | | | | | | | | | | | | | | | | | | | | | | | | | | | | | | |

701

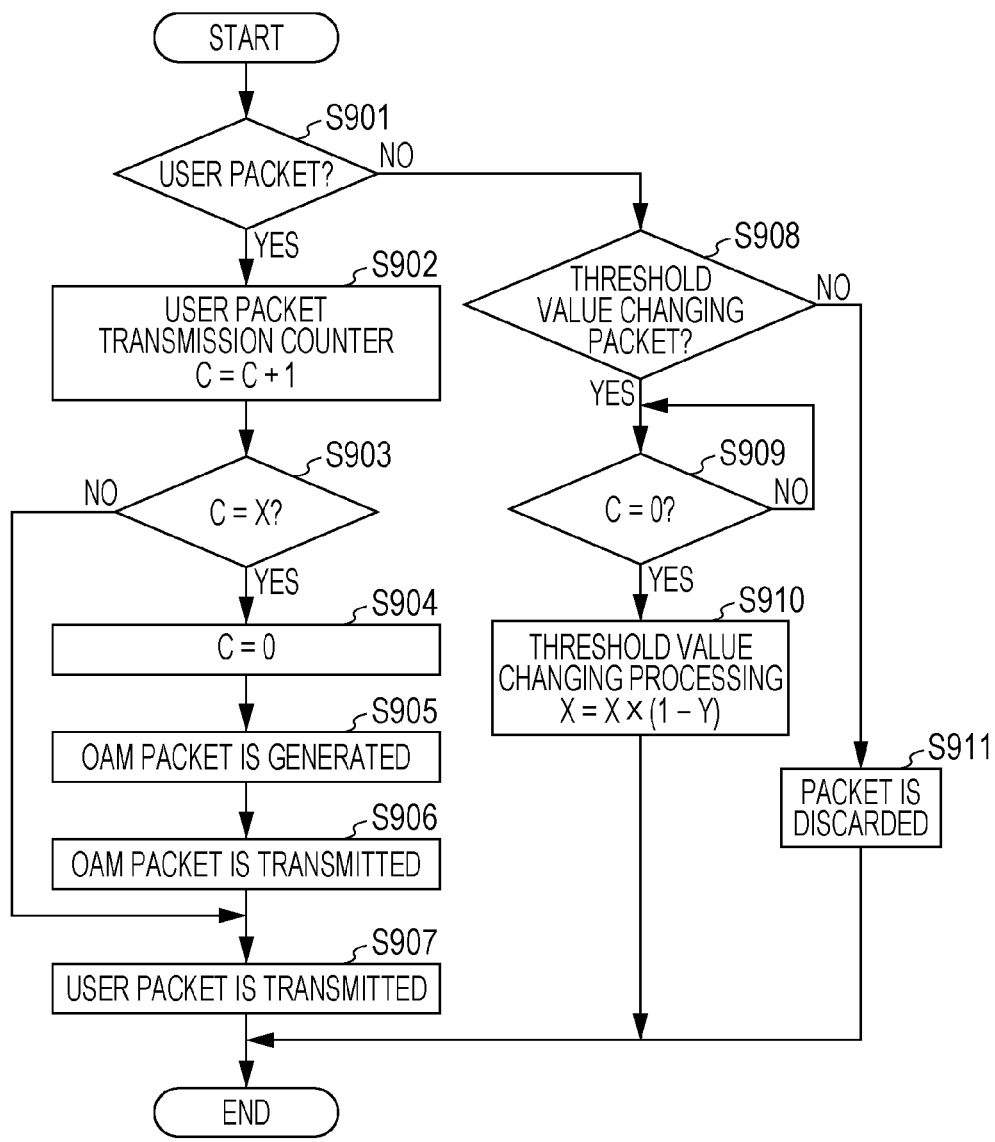

FIG. 13

| LOGICAL FLOW | CLASS 1 | CLASS 2 | CLASS 3 | CLASS 4 | CLASS 5 | ... | CLASS m | THRESHOLD VALUE 1 | THRESHOLD VALUE 2 | THRESHOLD VALUE 3 | THRESHOLD VALUE 4 | THRESHOLD VALUE 5 | ... | THRESHOLD VALUE m |
|---|---|---|---|---|---|---|---|---|---|---|---|---|---|---|
| 1 | ON | OFF | OFF | OFF | OFF | ... | OFF | 1000 | — | — | — | — | ... | — |
| 2 | ON | OFF | OFF | OFF | OFF | ... | OFF | 1000 | — | — | — | — | ... | — |
| 3 | ON | OFF | OFF | OFF | OFF | ... | OFF | 1000 | — | — | — | — | ... | — |
| 4 | ON | OFF | OFF | OFF | OFF | ... | OFF | 1000 | — | — | — | — | ... | — |
| ... | ... | ... | ... | ... | ... | ... | ... | ... | ... | ... | ... | ... | ... | ... |
| n | — | — | — | — | — | ... | — | — | — | — | — | — | ... | — |

1300

COMMUNICATION SYSTEM, COMMUNICATION DEVICE, AND COMMUNICATION METHOD

CROSS-REFERENCE TO RELATED APPLICATION

This application is based upon and claims the benefit of priority of the prior Japanese Patent Application No. 2013-009668, filed on Jan. 22, 2013, the entire contents of which are incorporated herein by reference.

FIELD

The embodiments discussed herein are related to a communication system, a communication device, and a communication method.

BACKGROUND

In the past, there has been a technique where, in a network to which a plurality of communication devices are connected, the measurement of a transmission path such as the measurement of the loss amount of packets between communication devices is measured. For example, there has existed a technique where a pseudo packet is generated in one communication device, the pseudo packet is received in the other communication device, and hence, a packet loss is measured. Such a technique has been disclosed in, for example, Japanese Laid-open Patent Publication No. 2003-244237.

In addition, for example, there has existed a technique where, in response to the measurement value of packets having flowed in a desired measurement direction during a time period from the previous transmission of a measurement packet to the current transmission of the measurement packet, weighting is performed on a communication quality. Such a technique has been disclosed in, for example, Japanese Laid-open Patent Publication No. 2004-007339.

In addition, there has existed Ethernet (ETH)-SL (one-Way Synthetic Loss Measurement: 1SL) of International Telecommunication Union (ITU)-T Y.1731 standard. The Ethernet is a registered trademark. In the ETH-SL, the number of losses of 1SL packets in a measurement section within a network is calculated, and transmission quality is measured.

In addition, there has existed ETH-Loss Measurement (LM) of the ITU-T Y. 1731 standard. In the ETH-LM, the number of losses in a measurement section of user packets flowing in a network is calculated, and transmission quality is measured.

However, in the above-mentioned techniques of the related art, since the number of transmissions of packets from a transmitting side is inserted into a packet and notified to a receiving side, there is a problem that a processing amount increases and it may be difficult to efficiently measure a transmission path.

SUMMARY

According to an aspect of the embodiments, a communication system includes a first communication device configured to transmit input data to a transmission path, detects a first accumulated amount of the input data, and transmit notifying data to the transmission path when the detected first accumulated amount has reached a threshold value, and a second communication device configured to receive data transmitted to the transmission path by the first communication device, detect a second accumulated amount of the received data, and output measurement information based on the detected second accumulated amount and the threshold value when having received the notifying data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an example of a configuration of a communication unit;

FIG. 5 is another explanatory diagram illustrating an example of a configuration of a communication unit;

FIG. 6 is an explanatory diagram illustrating an example of an Ethernet frame;

FIG. 7 is an explanatory diagram illustrating an example of an Ethernet frame including an OAM frame;

FIG. 8A is an explanatory diagram illustrating an example of a format of an OAM frame;

FIG. 9 is a flowchart illustrating an example of transmission processing a communication unit performs;

FIG. 13 is an explanatory diagram illustrating an example of a table expressing a threshold value with respect to each class in each logical flow;

DESCRIPTION OF EMBODIMENTS

Hereinafter, with reference to accompanying drawings, preferred embodiments of the disclosed technology will be described in detail.

Embodiment

Basic Configuration of Communication System

Figure 1:
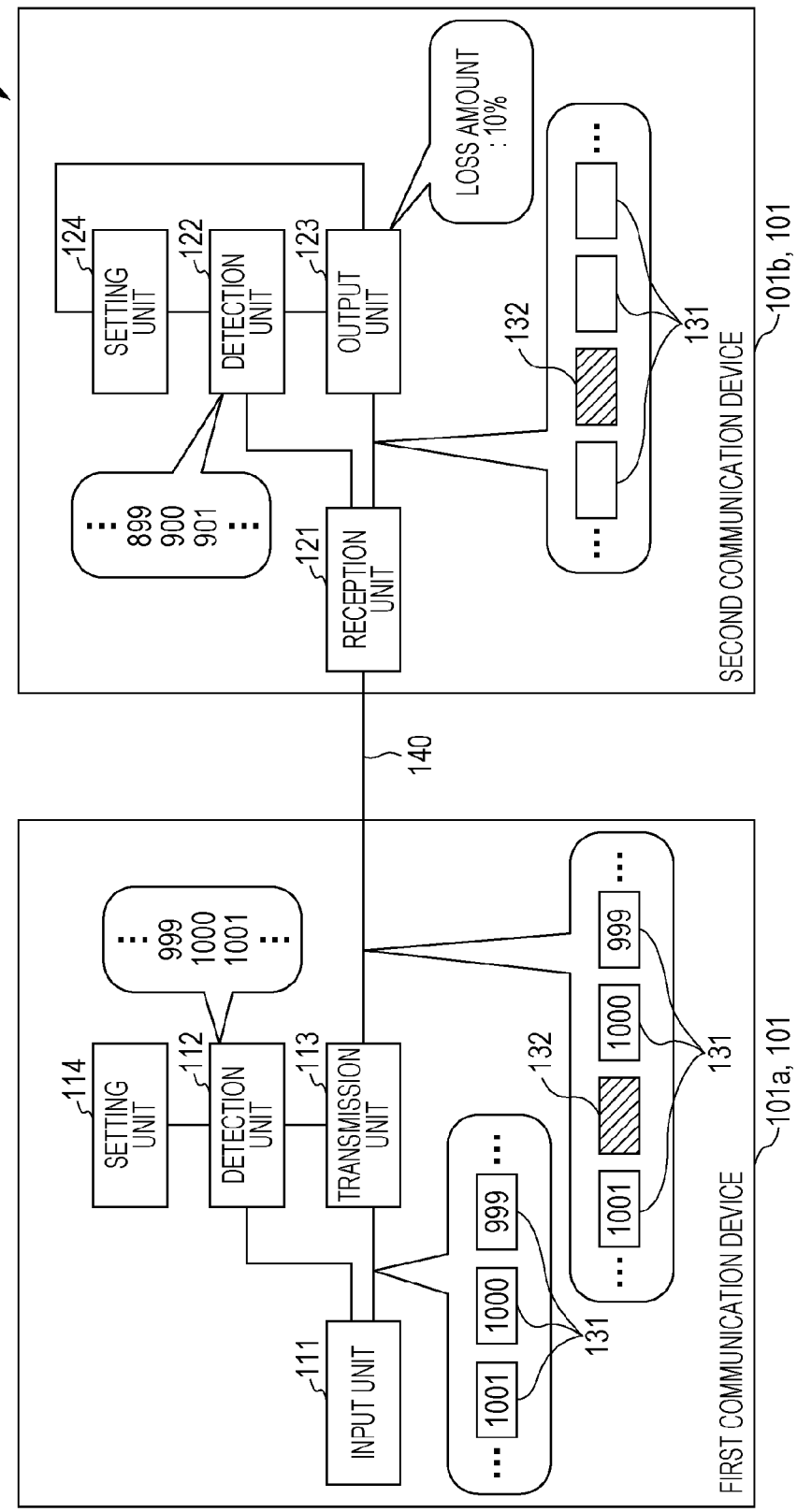
FIG. 1 is an explanatory diagram illustrating an example of a basic configuration of a communication system.

FIG. 1 is an explanatory diagram illustrating an example of the basic configuration of a communication system. As illustrated in FIG. 1, a communication system 100 includes a plurality of communication devices 101. In addition, in FIG. 1, it is assumed that the communication device 101 on a transmitting side is defined as a first communication device 101a and the communication device 101 on a receiving side is defined as a second communication device 101b, and these will be described. The communication devices 101 are, for example, nodes such as routers or computer devices.

The first communication device 101a includes an input unit 111, a detection unit 112, a transmission unit 113, and a setting unit 114. The input unit 111 inputs data. The data corresponds to, for example, user packets 131. The detection unit 112 detects the first accumulated amount of the user packets 131 input to the input unit 111. The first accumulated amount is, for example, the accumulated number of the user packets 131, and the detection unit 112 counts the accumulated number of the user packets 131.

The transmission unit 113 transmits, to a transmission path 140, the user packets 131 input to the input unit 111. In addition, when the first accumulated amount detected by the detection unit 112 has reached a threshold value set in the setting unit 114, the transmission unit 113 transmits a notifying packet 132 to the transmission path 140. For example, in a case where the threshold value set in the setting unit 114 is 1000 counts, when the user packets 131 have been counted 1000 times by the detection unit 112, the transmission unit 113 transmits the notifying packet 132 to the transmission path 140.

The second communication device 101b includes a reception unit 121, a detection unit 122, an output unit 123, and a setting unit 124. The reception unit 121 receives the user packets 131 or the notifying packet 132, transmitted to the transmission path 140 by the first communication device 101a.

The detection unit 122 detects the second accumulated amount of the user packets 131 received by the reception unit 121. The second accumulated amount is, for example, the accumulated number of the user packets 131, and the detection unit 122 counts the accumulated number of the user packets 131.

When having received the notifying packet 132, the output unit 123 outputs measurement information based on the second accumulated amount detected by the detection unit 122 and a threshold value set in the setting unit 124. The threshold value set in the setting unit 124 and the threshold value set in the setting unit 114 in the first communication device 101a are values equal to each other. For example, it is assumed that the threshold value set in the setting unit 124 is 1000 counts and the second accumulated amount detected by the detection unit 122 is 900 when the notifying packet 132 has been received. In this case, the measurement information may also be simple information, for example, information where the threshold value is "1000" and the second accumulated amount is "900".

In addition, on the basis of the second accumulated amount detected by the detection unit 122 and the threshold value, the output unit 123 calculates and outputs the loss amount of the user packets 131, as the measurement information. The loss amount is, for example, a difference (the number of losses) between the threshold value and the second accumulated amount or the proportion (loss rate) of this difference to the threshold value. Specifically, when it is assumed that the threshold value is "1000" and the second accumulated amount is "900", the loss rate turns out to be "(the threshold value of 1000–the second accumulated amount of 900)/the threshold value of 1000=10%".

The threshold value is, for example, a given value (for example, 1000). When the first accumulated amount has reached the threshold value, the detection unit 112 resets the first accumulated amount serving as, for example, the number of counts of the user packets 131. In addition, when the reception unit 121 has received the notifying packet 132, the detection unit 122 resets the second accumulated amount serving as, for example, the number of counts of the user packets 131.

In addition, the threshold value may also be set as a plurality of setting values, for example, 1000, 2000, 3000, 4000, . . . . In this case, when the first accumulated amount has reached the threshold value, the detection unit 112 may not reset the first accumulated amount. In the same way, when the reception unit 121 has received the notifying packet 132, the detection unit 122 may not reset the second accumulated amount.

In addition, the first communication device 101a includes a reception unit not illustrated. The reception unit receives the measurement information from the second communication device 101b. On the basis of the measurement information received by the reception unit, the setting unit 114 changes the set threshold value. On the basis of the measurement information output from the output unit 123, the setting unit 124 changes the set threshold value. The threshold value changed by the setting unit 114 and the threshold value changed by the setting unit 124 are values equal to each other.

Specifically, when the loss amount of the user packets 131, based on the measurement information received by the reception unit, is a first loss amount (for example, the loss rate of 5%), the setting unit 114 sets the threshold value to a first value (1000). In addition, when the loss amount is a second loss amount (for example, the loss rate of 10%) larger than the first loss amount, the setting unit 114 sets the threshold value to a second value (for example, 900) smaller than the first value.

In the same way, when the loss amount of the user packets 131, based on the measurement information output from the output unit 123, is the first loss amount (for example, the loss rate of 5%), the setting unit 124 sets the threshold value to the first value (1000). In addition, when the loss amount is the second loss amount (for example, the loss rate of 10%), the setting unit 124 sets the threshold value to the second value (for example, 900).

In addition, the setting unit 114 sets the threshold value with respect to each user of the user packets 131 input to the input unit 111. The detection unit 112 detects the first accumulated amount of the user packets 131 input to the input unit 111, with respect to each user. The transmission unit 113 transmits, to the transmission path 140, the notifying packet 132 on a user where the first accumulated amount detected by the detection unit 112 has reached the threshold value.

The detection unit 122 detects the second accumulated amount with respect to each user. When the reception unit 121 has received the notifying packet 132, the output unit 123 outputs measurement information based on the second accumulated amount detected with respect to a user corresponding to the notifying packet 132 and the threshold value of the user corresponding to the notifying packet 132.

In addition, the setting unit 114 sets the threshold value with respect to each service type of the user packets 131 input to the input unit 111. The detection unit 112 detects the first accumulated amount of the user packets 131 input to the input unit 111 with respect to each service type. The transmission unit 113 transmits, to the transmission path 140, the notifying packet 132 on a service type where the first accumulated amount detected by the detection unit 112 has reached the threshold value.

The detection unit 122 detects the second accumulated amount with respect to each service type. When the reception unit 121 has received the notifying packet 132, the output unit 123 outputs measurement information based on the second accumulated amount detected with respect to a service type corresponding to the notifying packet 132 and the threshold value of the service type corresponding to the notifying packet 132.

In addition, the measurement target may also be the combination of a user and a service in addition to each user or each service type. Specifically, when a plurality of service types are set with respect to each user, the combination of each user and each service type may be defined as a measurement target.

In addition, the transmission unit 113 transmits the notifying packets 132 to which successive pieces of identification information are assigned. While the successive pieces of identification information are, for example, sequence numbers, characters or symbols may also be adopted. When first identification information assigned to the notifying packet 132 received by the reception unit 121 is not continuous from second identification information assigned to the previously received notifying packet 132, the output unit 123 outputs the measurement information using a difference between the first identification information and the second identification information.

For example, when it is assumed that the first identification information is "4" and the second identification information is "1", a difference, "3", between the first identification information and the second identification information corresponds to a time period during which the notifying packet 132 has not been received. Therefore, with taking into consideration the fact that the second accumulated amount detected by the detection unit 122 corresponds to three periods, the output unit 123 calculates and outputs a loss amount. For example, when a time period during which the notifying packet 132 has not been received corresponds to three periods, the loss amount may be calculated by tripling the threshold value or dividing the second accumulated amount by three.

The transmission unit 113 may be switchable between a first state where the notifying packet 132 is transmitted to the transmission path 140 when the first accumulated amount has reached the threshold value and a second state where a measuring packet is periodically transmitted to the transmission path 140. The second state is, for example, a state where measurement is performed owing to the Ethernet (ETH)-SL (one-Way Synthetic Loss Measurement: 1SL) of International Telecommunication Union (ITU)-TY.1731 standard. The ETH-SL will be referred to as "1SL" hereinafter. In the 1SL, the number of losses of measuring packets (1SL packets) in a measurement section within a network is calculated, and transmission quality is measured.

The transmission unit 113 transmits, to the second communication device 101b, a signal inquiring whether or not it may be possible to measure the transmission path 140 on the basis of the notifying packet 132. In response to a response from the second communication device 101b, the transmission unit 113 switches to the first state or the second state.

When having received measuring data, the output unit 123 may be switchable between a first state where measurement information based on the second accumulated amount and the threshold value is output and a second state where measurement information based on the accumulated amount of the received measuring data is output. When the reception unit 121 has received information indicating that the first communication device 101a is switchable to the first state, the output unit 123 switches to the first state.

In addition, the first accumulated amount and the second accumulated amount are not limited to the accumulated numbers of the user packets 131, and may also be the accumulated data amounts of the user packets 131, and this case will be described. The detection unit 112 detects the first accumulated data amount of the user packets 131 input to the input unit 111. When the first accumulated data amount of the number of the user packets 131, detected by the detection unit 112, has reached the threshold value set in the setting unit 114, the transmission unit 113 transmits the notifying packet 132 to the transmission path 140.

In addition, the detection unit 122 detects the second accumulated data amount of the user packets 131 received by the reception unit 121. When the reception unit 121 has received the notifying packet 132, the output unit 123 outputs measurement information based on the second accumulated data amount detected by the detection unit 122 and the threshold value set in the setting unit 124.

(Example of Network to which Communication System is Applicable)

Figure 2:
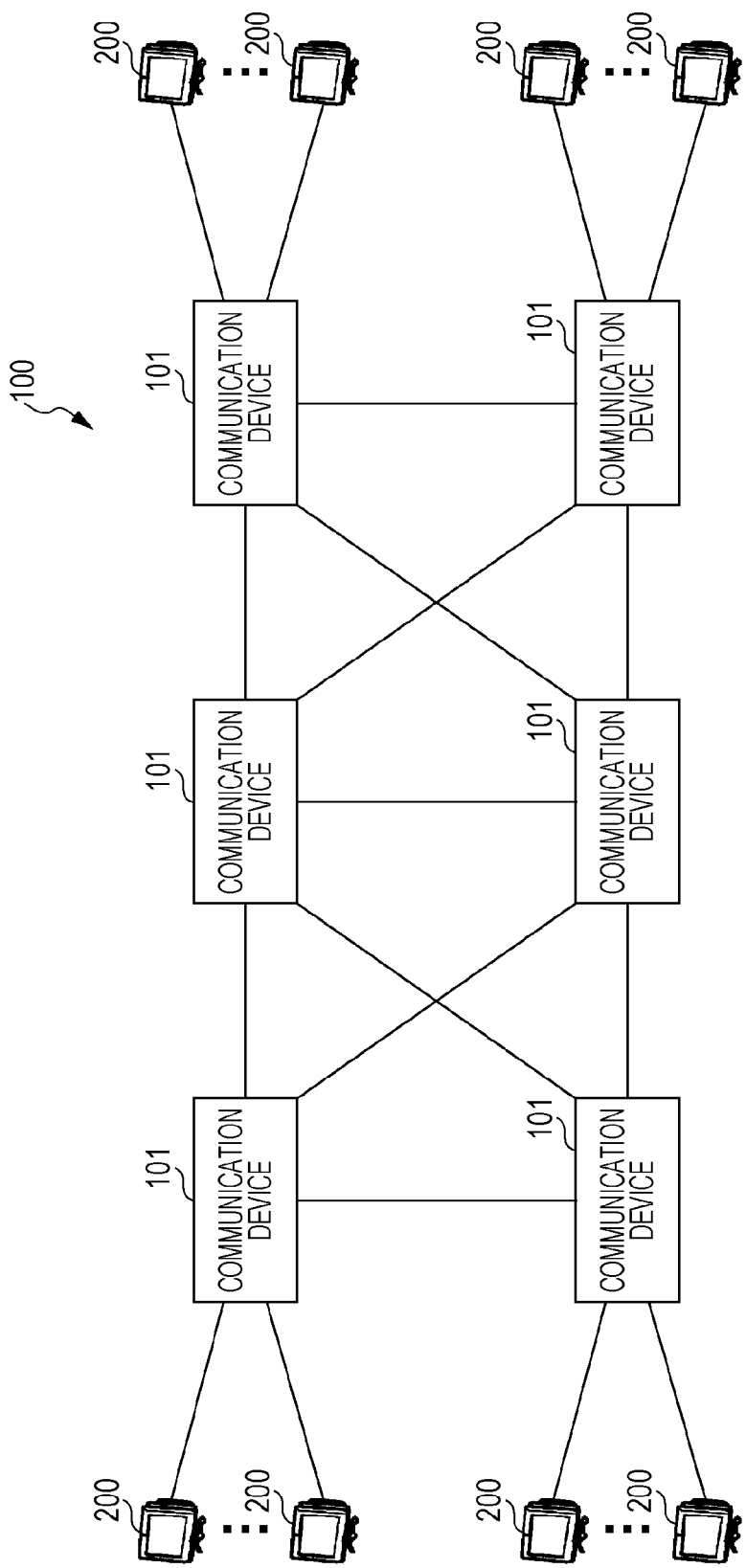
FIG. 2 is an explanatory diagram illustrating an example of a network to which a communication system is applicable.

FIG. 2 is an explanatory diagram illustrating an example of a network to which a communication system is applicable. As illustrated in FIG. 2, the communication system 100 includes the plural communication devices 101 and a plurality of user terminals 200. The user terminals 200 are, for example, computer devices used by users. The user terminals 200 are individually connected through the communication devices 101. The communication devices 101 and the user terminals 200 individually transmit and receive data between the communication devices 101 and the user terminals 200, between the user terminals 200, or between the communication devices 101.

The communication device 101 receives data from another communication device 101 or the user terminal 200, and transfers the data to the communication device 101 or the user terminal 200, identified on the basis of address information or the like stored within the data. For example, when transferring an Ethernet (registered trademark) frame or an IP frame, the communication device 101 performs transfer processing for data on the basis of a MAC address stored within the Ethernet frame, an IP address stored within the IP frame, or the like.

The communication system 100 illustrated in FIG. 1 is applicable to the individual communication devices 101 connected to each other or the communication device 101 and the user terminal 200 connected to each other.

(Configuration of Communication Device)

Figure 3:
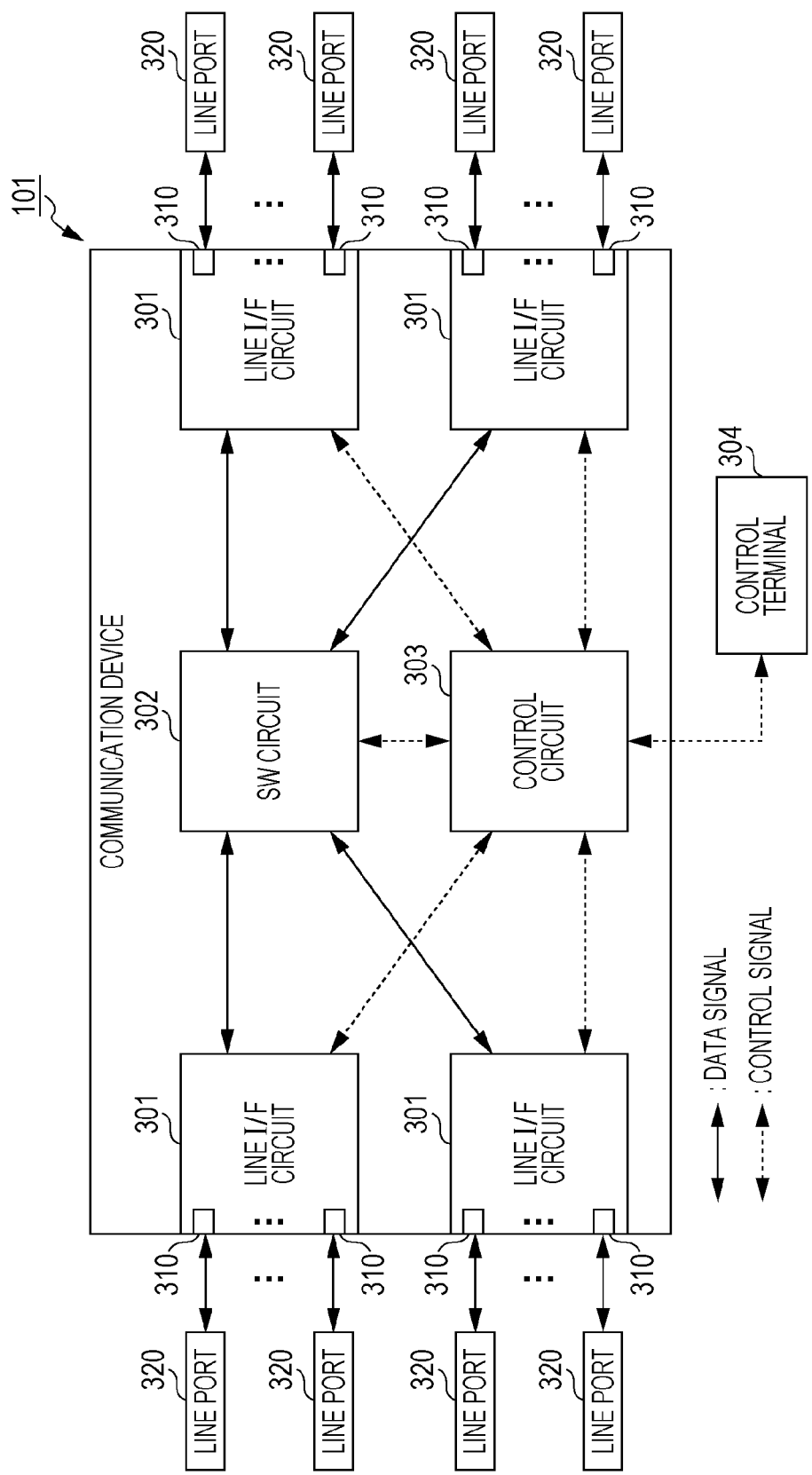
FIG. 3 is a block diagram illustrating an example of a configuration of a communication device.

FIG. 3 is a block diagram illustrating an example of the configuration of a communication device. As illustrated in FIG. 3, the communication device 101 includes a plurality of line I/F circuits 301, a SW circuit 302, and a control circuit 303. In addition, in FIG. 3, solid lines connecting the individual circuits 301, 302, and 303 express the transmission and reception of data signals, and dashed lines express the transmission and reception of control signals. Each of the line I/F circuits 301 includes a circuit performing reception processing or transmission processing, and functions as an interface with an external device.

For example, each of the line I/F circuits 301 includes a plurality of communication units 310 and a plurality of line ports 320 connected to other communication devices. The communication unit 310 transmits and receives data to and from another communication device through the line port 320. The line I/F circuit 301 is realized using, for example, an attachable and detachable module or card.

The SW circuit 302 is a circuit that is connected to the line I/F circuits 301 within the communication device 101 and has a switch function for data transfer between the line I/F circuits 301. The SW circuit 302 is realized using, for example, an attachable and detachable module or card.

The control circuit 303 is connected to the line I/F circuits 301 and the SW circuit 302, and performs the control of the whole communication device 101, which includes various kinds of settings for individual circuits within the communication device 101, an alarm, the collection of statistical information, and so forth. In addition, the control circuit 303 is connected to a control terminal 304 such as an external monitor. The control circuit 303 is realized using, for example, an attachable and detachable module or card. In addition, the line I/F circuits 301, the SW circuit 302, and the control circuit 303 may not be attachable and detachable, and may also be integrated with a mother board (mother card) in the communication device 101.

(Configuration of Communication Unit)

FIG. 4 is an explanatory diagram illustrating an example of the configuration of a communication unit. In FIG. 4, a function for transmitting data and a function for receiving data in the communication units 310 in the two communication devices 101 connected to each other will be described. In the example illustrated in FIG. 4, it is assumed that the communication unit 310 in the communication device 101 on a transmitting side is a communication unit 310a and the communication unit 310 in the communication device 101 on a receiving side is a communication unit 310b, and these will be described.

User packets are sequentially input to the communication unit 310a. The communication unit 310a includes a transmission counter 401, a transmission control unit 402, an operation administration and maintenance (OAM) generation unit 403, and a multiprocessing unit 404. The transmission counter 401 counts the user packets input to the communication unit 310a, and notifies the transmission control unit 402 of a counted count value (the number of user packets). Specifically, the transmission counter 401 increments the count value every time the user packet is input to the communication unit 310a. In addition, when a reset signal has been output from the transmission control unit 402, the transmission counter 401 resets the count value to "0".

When the count value given notice of by the transmission counter 401 has reached a predetermined threshold value preliminarily set (for example, 1000), the transmission control unit 402 outputs a trigger signal to the OAM generation unit 403, and outputs the reset signal to the transmission counter 401.

When the trigger signal has been input from the transmission control unit 402, the OAM generation unit 403 generates an OAM packet 420 indicating that the number of user packets has reached the threshold value, and outputs the generated OAM packet 420 to the multiprocessing unit 404. The OAM packet 420 is realized using, for example, the notifying packet 132 in FIG. 1.

The multiprocessing unit 404 multiplexes (time-division multiplexes) and transmits the OAM packet 420 output from the OAM generation unit 403 and the user packets input to the communication unit 310a, to the communication unit 310b through the line port 320. For example, when the OAM packet 420 is to be output subsequent to the 1000th user packet, the multiprocessing unit 404 halts the transmission of the 1001st user packet until the OAM packet 420 is transmitted after the transmission of the 1000th user packet. In addition, the 1001st user packet is transmitted after the transmission of the OAM packet 420.

The communication unit 310b includes a received packet identification unit 411, a reception counter 412, a reception control unit 413, a storage processing unit 414, and a memory 415. The received packet identification unit 411 identifies whether a packet received by the line port 320 is the user packet or the OAM packet 420. When the packet received by the line port 320 is the user packet, the received packet identification unit 411 outputs, to the reception counter 412, a signal indicating that effect. In addition, when the packet received by the line port 320 is the OAM packet 420, the received packet identification unit 411 outputs the OAM packet 420 to the reception control unit 413.

On the basis of the signal from the received packet identification unit 411, the reception counter 412 counts the receptions of the user packets in the communication unit 310b. Specifically, the reception counter 412 increments a count value every time the signal is output from the received packet identification unit 411. In addition, the reception counter 412 notifies the reception control unit 413 of the counted number of user packets. In addition, when the reset signal has been output from the reception control unit 413, the reception counter 412 resets the count value to "0".

When having input the OAM packet 420 from the received packet identification unit 411, the reception control unit 413 calculates user packet loss information on the basis of the count value (the number of user packets) given notice of by the reception counter 412 and a threshold value (for example, 1000) preliminarily set. The threshold value set in the reception control unit 413 and the threshold value set in the transmission control unit 402 are values equal to each other.

The user packet loss information is the loss amount of user packets, and the number of user packet losses or a user packet loss rate may be cited. The number of user packet losses is a difference between the threshold value and the number of user packets given notice of by the reception counter 412. For example, when it is assumed that the threshold value is 1000 and the number of user packets given notice of is 900, the number of user packet losses turns out to be "the threshold value (1000)–the number (900) of user packets given notice of=100".

In addition, the user packet loss rate is the proportion of the number of user packet losses to the threshold value. For example, when it is assumed that the threshold value is 1000 and the number of user packets given notice of is 900, the user packet loss rate turns out to be "(1000–900)/1000=10%".

The reception control unit 413 notifies the storage processing unit 414 of the calculated user packet loss information. In addition, when having input the OAM packet 420 from the received packet identification unit 411, the reception control unit 413 outputs the reset signal to the reception counter 412.

The storage processing unit 414 performs processing for storing, in the memory 415, the user packet loss information given notice of by the reception control unit 413. The memory 415 stores therein the user packet loss information owing to the processing of the storage processing unit 414.

FIG. 5 is another explanatory diagram illustrating an example of the configuration of a communication unit. In FIG. 5, the same symbol is assigned to the same configuration as the configuration illustrated in FIG. 4, and the description thereof will be omitted. For example, the communication unit 310 illustrated in FIG. 5 may be applied to each of the communication units 310 in the two communication devices 101 connected to each other. As illustrated in FIG. 5, the communication unit 310 includes the transmission counter 401, the transmission control unit 402, the OAM generation unit 403, the multiprocessing unit 404, the received packet identification unit 411, the reception counter 412, the reception control unit 413, the storage processing unit 414, and the memory 415.

The transmission control unit 402 includes a threshold value processing unit 501, an OAM packet generation instruction unit 502, a threshold value changing packet generation instruction unit 503, and a threshold value changing instruction unit 504.

The transmission counter 401 counts the user packet, and outputs the counted number of packets to the threshold value processing unit 501. In the threshold value processing unit 501, a threshold value (for example, 1000) for the number of user packets is set. When having input a reset signal from the threshold value processing unit 501, the transmission counter 401 resets a count value.

When the number of packets, output from the transmission counter 401, has reached the set threshold value, the threshold value processing unit 501 outputs, to the OAM packet generation instruction unit 502, a signal indicating that effect, and outputs the reset signal to the transmission counter 401. In addition, when having input a changing signal from the threshold value changing instruction unit 504, the threshold value processing unit 501 changes the threshold value.

When having input the signal from the threshold value processing unit 501, the OAM packet generation instruction unit 502 outputs a trigger signal to the OAM generation unit 403. In addition, when having input a signal indicating that the OAM packet 420 has been input from an OAM packet reception unit 511 described later, the OAM packet generation instruction unit 502 outputs the trigger signal to the OAM generation unit 403.

When having input a predetermined signal from a threshold value changing notification processing unit 513 described later, the threshold value changing packet generation instruction unit 503 outputs a trigger signal to the OAM generation unit 403. The predetermined signal is, for example, an error signal indicating that the user packet loss rate is greater than or equal to a predetermined value or less than or equal to the predetermined value (that the user packet loss rate does not fall within a predetermined range) or a packet signal indicating that a threshold value changing packet has been input. On the basis of the trigger signal output from the threshold value changing packet generation instruction unit 503, the OAM generation unit 403 generates a threshold value changing packet. By causing the OAM generation unit 403 to generate the threshold value changing packet, it may be possible to cause the threshold value of the communication device 101 serving as a transmission destination (upstream).

When having input the above-mentioned predetermined signal (the error signal or the packet signal) from the threshold value changing notification processing unit 513, the threshold value changing instruction unit 504 outputs the changing signal to the threshold value processing unit 501.

The reception control unit 413 includes the OAM packet reception unit 511, a threshold value processing unit 512, and the threshold value changing notification processing unit 513. Every time a signal is output from the received packet identification unit 411, the reception counter 412 increments a count value, and notifies the threshold value processing unit 512 of the incremented count value (the number of user packets).

When a received packet is the OAM packet 420, the received packet identification unit 411 outputs the OAM packet 420 to the OAM packet reception unit 511. In addition, when the received packet is the threshold value changing packet, the received packet identification unit 411 outputs the threshold value changing packet to the threshold value changing notification processing unit 513.

When having input the OAM packet 420 from the received packet identification unit 411, the OAM packet reception unit 511 outputs, to the OAM packet generation instruction unit 502 and the threshold value processing unit 512, a signal indicating that the OAM packet 420 has been input. When having input the signal from the OAM packet reception unit 511, the threshold value processing unit 512 calculates user packet loss information using the count value given notice of by the reception counter 412 and the threshold value (for example, 1000) set by the threshold value processing unit 501. In addition, the threshold value processing unit 512 notifies the storage processing unit 414 and the threshold value changing notification processing unit 513 of the calculated user packet loss information.

When the user packet loss information (user packet loss rate) given notice of by the threshold value processing unit 512 is greater than or equal to a predetermined value (for example, 10%), the threshold value changing notification processing unit 513 outputs an error signal to the threshold value changing packet generation instruction unit 503 and the threshold value changing instruction unit 504. In addition, when having input the threshold value changing packet from the received packet identification unit 411, the threshold value changing notification processing unit 513 outputs a packet signal to the threshold value changing packet generation instruction unit 503 and the threshold value changing instruction unit 504.

(Example of Ethernet Frame)

FIG. 6 is an explanatory diagram illustrating an example of an Ethernet frame. In FIG. 6, an Ethernet frame 600 includes a media access control (MAC) DA 601, a MAC SA 602, an Ethernet-type (E-TYPE) 603, a protocol data unit (PDU) 604, and a frame check sequence (FCS) 605. An Ethernet frame 610 further includes a VLAN Tag 611 in addition to the above-mentioned. In addition, in FIG. 6, numeric characters in parentheses express the numbers of bits.

The MAC DA 601 indicates the MAC address of a destination. The MAC SA 602 indicates the MAC address of a transmission source. The E-TYPE 603 indicates a message type stored in the PDU 604. For example, the E-TYPE 603 of 0x0800 indicates an IPv4 frame. The standard E-TYPE 603 is specified by Internet Assigned Numbers Authority (IANA). In the PDU 604, a message in an upper layer is stored. The FCS 605 is a code used for detecting an error in a frame.

The VLAN Tag 611 includes a Tag Protocol ID (TPID) 612, a Priority 613, a Drop Eligible Indication (DEI) 614, and a VLAN ID 615. The TPID 612 is a type of Ethernet-Type and an ID indicating that the VLAN ID 615 is stored in a subsequent stage, and, for example, 0x8100 specified in IEEE802.1Q is set therein. The Priority 613 indicates the priority of a VLAN Tag frame. The Priority 613 is 3-bit, and capable of displaying priorities of eight classes.

The DEI 614 indicates a discard priority. For example, at the time of congestion, a frame of DEI=1 is preferentially discarded. The VLAN ID 615 indicates an identification value used for identifying a user. The Ethernet frame 600 and the Ethernet frame 610 are used for, for example, a user packet.

(Example of Ethernet Frame Including OAM Frame)

FIG. 7 is an explanatory diagram illustrating an example of an Ethernet frame including an OAM frame. In FIG. 7, the description of the same configuration as the Ethernet frame 610 illustrated in FIG. 6 will be omitted. In FIG. 7, an Ethernet frame 700 is different from the Ethernet frame 610 illustrated in FIG. 6 in that the Ethernet frame 700 includes an OAM frame 701 in place of the PDU 604. The detailed configuration of the OAM frame 701 will be described using FIG. 8A.

(Example of Format of OAM Frame)

FIG. 8A is an explanatory diagram illustrating an example of the format of an OAM frame. Each stage of the OAM frame 701 illustrated in FIG. 8A indicates a region corresponding to four Bytes. As illustrated in FIG. 8A, the OAM frame 701 includes, for example, pieces of data such as MEL, Version, OpCode, Flags, TLV Offset, Source MEP ID, and End TLV. In addition, compared with a 1SL packet format described later (refer to FIG. 24), the OAM frame 701 include no Test ID and no TxSeqf.

(Example of Threshold Value Changing Packet)

Figure 8B:
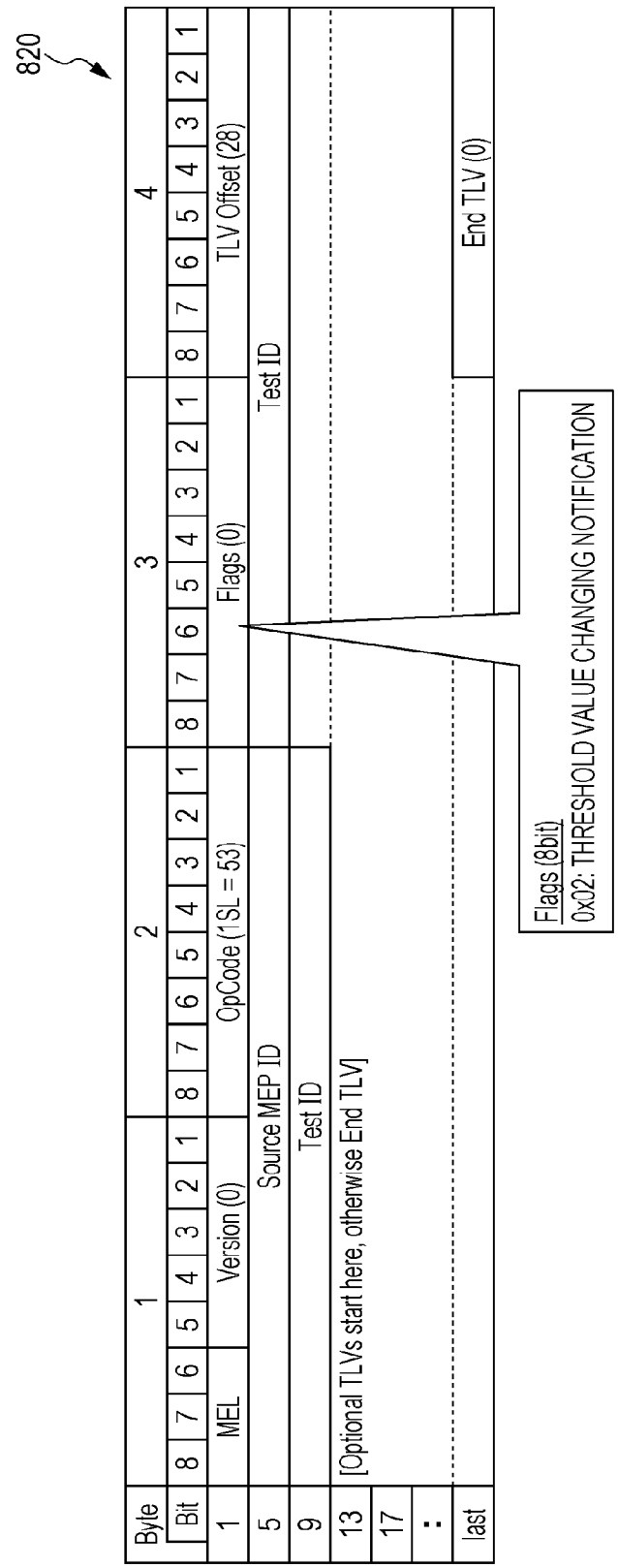
FIG. 8B is an explanatory diagram illustrating an example of a threshold value changing packet.

Next, an example of a threshold value changing packet due to the format of a 1SL-based OAM frame. FIG. 8B is an explanatory diagram illustrating an example of a threshold value changing packet. In addition, the 1SL is a measurement method for a packet loss, which is capable of calculating how many 1SL packets within a network have been lost in a measurement section and broadly measuring transmission quality. As illustrated in FIG. 8B, the Flags in an OAM frame 820 includes the data (0x02) of a threshold value changing notification. For example, a packet where the data of the threshold value changing notification is included in the Flags in the OAM frame 820 is the threshold value changing packet.

(Transmission Processing Communication Unit Performs)

FIG. 9 is a flowchart illustrating an example of transmission processing a communication unit performs. As illustrated in FIG. 9, every time a packet is input to the communication unit 310, the communication unit 310 executes, for example, the following individual steps. The input of packets includes the input of a user packet to be transmitted by the communication unit 310, the reception of the threshold value changing packet, and the input of another packet.

First, the communication unit 310 determines whether or not an input packet is a user packet (step S901). When the input packet is the user packet (step S901: Yes), the communication unit 310 increments the count value C of the transmission counter 401, which indicates the number of user packets to be transmitted (step S902). Next, the communication unit 310 determines whether or not the count value C is a threshold value X (for example, 1000) (step S903).

When the count value C is not the threshold value X (step S903: No), the communication unit 310 transfers to a processing operation in a step S907. When the count value C is the threshold value X (step S903: Yes), the communication unit 310 resets the count value C to "0" (step S904). In addition, the communication unit 310 generates the OAM packet 420 (step S905). Next, the communication unit 310 multiplexes the OAM packet 420 with the user packet and transmits the OAM packet 420 (step S906). Next, the communication unit 310 transmits the user packet (step S907), and terminates a series of processing operations due to the present flowchart.

When, in the step S901, the input packet is not the user packet (step S901: No), the communication unit 310 determines whether or not the input packet is the threshold value changing packet (step S908). The threshold value changing packet is, for example, a packet received from the communication device 101 serving as the transmission destination (on a downstream side) of the user packet or the OAM packet 420, and generated in a reception processing operation described later (step S1008 in FIG. 10).

When, in the step S908, the input packet is the threshold value changing packet (step S908: Yes), the communication unit 310 determines whether or not the count value C of the transmission counter is "0" (step S909). When the count value C of the transmission counter is not "0" (step S909: No), the communication unit 310 waits until the count value C of the transmission counter becomes "0".

When the count value C of the transmission counter has become "0" (step S909: Yes), the communication unit 310 executes a threshold value changing processing operation (step S910), and terminates a series of processing operations due to the present flowchart. In the threshold value changing processing operation, the communication unit 310 changes a threshold value X with defining a value as a new threshold value X, the value being calculated as the threshold value X×(1−Y) using, for example, a user packet loss rate Y. Specifically, when it is assumed that the threshold value X=1000 and the user packet loss rate Y=0.1 (10%), the new threshold value X turns out to be 1000×(1−0.1)=900.

When, in the step S908, the input packet is not the threshold value changing packet (step S908: No), the communication unit 310 discards the input packet (step S911), and terminates a series of processing operations due to the present flowchart.

(Reception Processing Communication Unit Performs)

Figure 10:
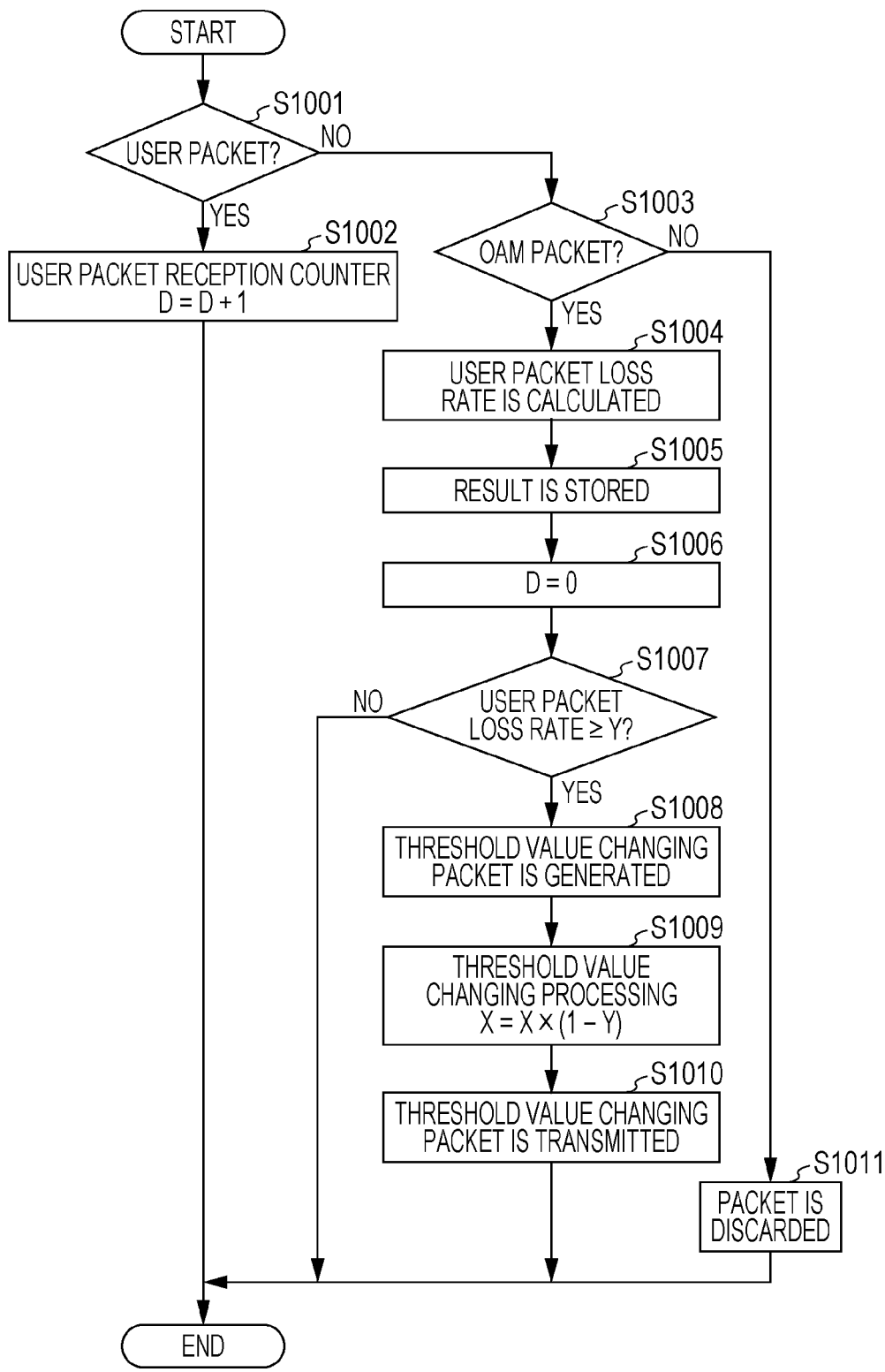
FIG. 10 is a flowchart illustrating an example of reception processing a communication unit performs.

FIG. 10 is a flowchart illustrating an example of reception processing a communication unit performs. In FIG. 10, every time a packet is input to the communication unit 310, the communication unit 310 executes, for example, the following individual steps.

As illustrated in FIG. 10, the communication unit 310 determines whether or not a received packet is a user packet (step S1001). When the received packet is the user packet (step S1001: Yes), the communication unit 310 increments the count value D of the reception counter 412, which indicates the number of received user packets (step S1002), and terminates a series of processing operations due to the present flowchart.

When the received packet is not the user packet (step S1001: No), the communication unit 310 determines whether or not the received packet is the OAM packet 420 (step S1003). When the received packet is the OAM packet 420 (step S1003: Yes), the communication unit 310 calculates a user packet loss rate (step S1004). Next, the communication unit 310 stores the user packet loss rate in the memory 415 (step S1005), and resets the count value D of the reception counter 412 to "0" (step S1006).

Next, the communication unit 310 determines whether or not the calculated user packet loss rate is greater than or equal to a set user packet loss rate Y (step S1007). When the calculated user packet loss rate is less than the set user packet loss rate Y (step S1007: No), the communication unit 310 terminates a series of processing operations due to the present flowchart.

When the calculated user packet loss rate is greater than or equal to the set user packet loss rate Y (step S1007: Yes), the communication unit 310 generates the threshold value changing packet (step S1008). Next, the communication unit 310 executes a threshold value changing processing operation (step S1009). In the threshold value changing processing operation, a threshold value X is changed with a value defined as a new threshold value X, the value being calculated as the threshold value X×(1−Y) using, for example, the user packet loss rate Y. Specifically, when it is assumed that the threshold value X=1000 and the user packet loss rate Y=0.1 (10%), the new threshold value X turns out to be 1000×(1−0.1)=900.

Next, the communication unit 310 also transmits, to the communication device 101 serving as the transmission source (on an upstream side) of various kinds of packets, a threshold value changing packet used for changing the threshold value in the same way (step S1010), and terminates a series of processing operations due to the present flowchart.

When, in the step S1003, the received packet is not the OAM packet 420 (step S1003: No), the communication unit 310 discards the packet (step S1011), and terminates a series of processing operations due to the present flowchart.

As described above, according to the embodiment, it may be possible to measure user packet loss information using a simple configuration and simple processing, and it may be possible to efficiently measure a transmission path. In addition, it may be possible to reduce an increase in a circuit size without installing a plurality of circuits.

In addition, in the embodiment, the threshold value is decreased when the user packet loss information (user packet loss rate) is greater than or equal to the predetermined value (10%). Accordingly, it may be possible to enhance the measurement accuracy of the user packet loss rate when the user packet loss rate is high. Owing to this, it may be possible to understand the state of an error, for example, whether a packet loss discretely occurs or locally occurs.

In addition, while, in the embodiment, the threshold value is decreased when the user packet loss rate is greater than or equal to the predetermined value, the embodiment is not limited to this. In addition, the threshold value may also be increased when the user packet loss rate is less than or equal to the predetermined value. Owing to this, when a packet loss rate is low, it may be possible to lower measurement accuracy, and it may be possible to reduce a load on a line or a processing load on each communication unit 310 in measurement.

(Example of Another Configuration of Communication Unit)

Figure 11:
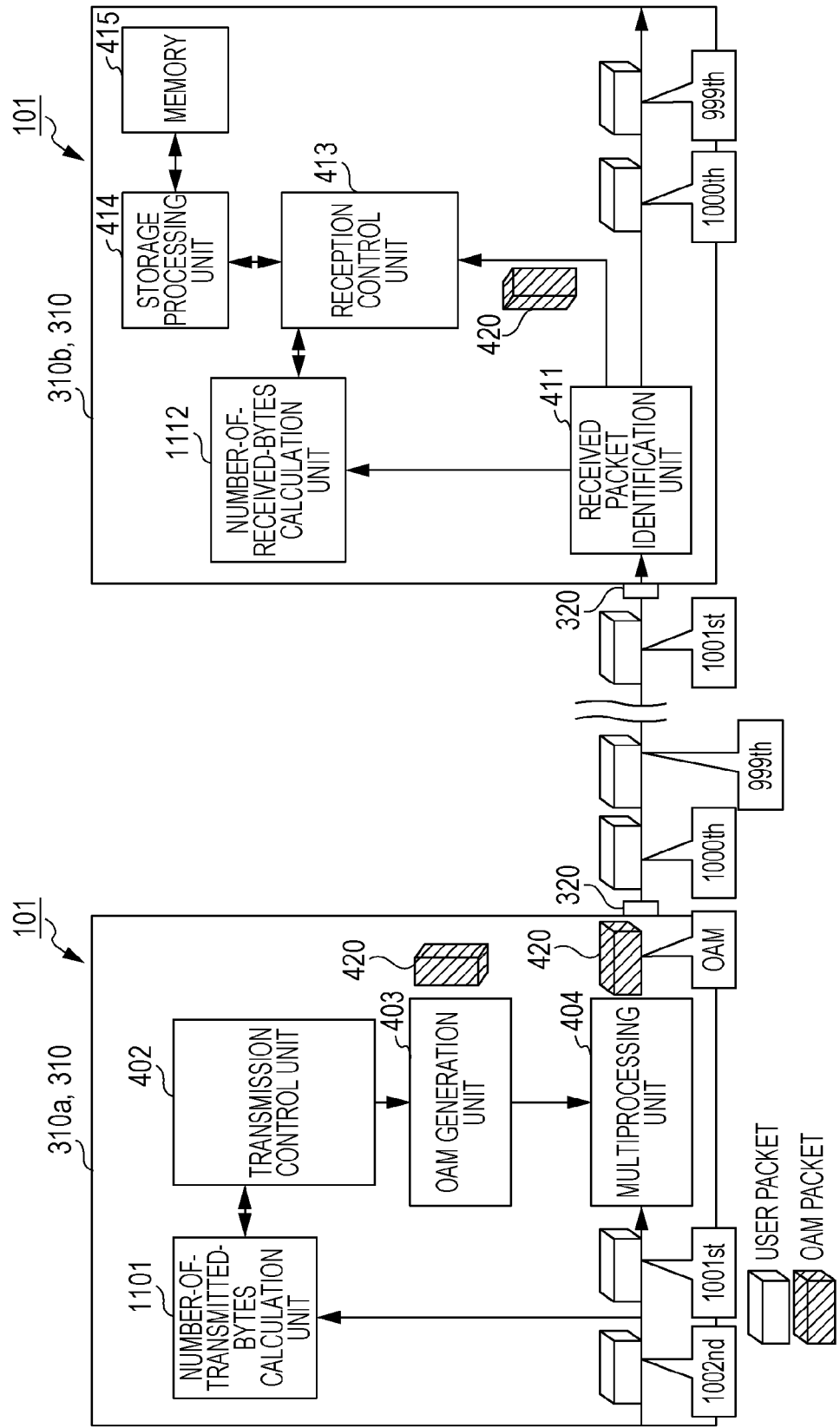
FIG. 11 is an explanatory diagram illustrating an example of another configuration of a communication unit.

FIG. 11 is an explanatory diagram illustrating an example of another configuration of a communication unit. In FIG. 11, the same symbol is assigned to the same configuration as the configuration illustrated in FIG. 4, and the description thereof will be omitted. The communication unit 310 illustrated in FIG. 11 is different from the configuration illustrated in FIG. 4 in that the communication unit 310 does not count the number of user packets but counts the number of bytes of a user packet.

As illustrated in FIG. 11, the communication unit 310a includes a number-of-transmitted-bytes calculation unit 1101. The number-of-transmitted-bytes calculation unit 1101 accumulates the number of bytes of a user packet, and notifies the transmission control unit 402 of the accumulated number of bytes. When a reset signal has been output from the transmission control unit 402, the number-of-transmitted-bytes calculation unit 1101 resets the accumulated number of bytes to "0".

When the accumulated number of bytes given notice of by the number-of-transmitted-bytes calculation unit 1101 has reached a predetermined threshold value (for example, 1 Gbytes) preliminarily set, the transmission control unit 402 outputs a trigger signal to the OAM generation unit 403, and outputs the reset signal to the number-of-transmitted-bytes calculation unit 1101.

The communication unit 310b includes a number-of-received-bytes calculation unit 1112. When a packet received by the line port 320 is a user packet, the received packet identification unit 411 outputs a signal indicating that effect, to the number-of-received-bytes calculation unit 1112, and outputs the user packet to the line I/F circuit 301. In addition, when the packet received by the line port 320 is the OAM packet 420, the received packet identification unit 411 outputs the OAM packet 420 to the reception control unit 413.

On the basis of the signal from the received packet identification unit 411, the number-of-received-bytes calculation unit 1112 accumulates the number of user packet bytes in the communication unit 310b. Specifically, the number-of-received-bytes calculation unit 1112 accumulates the number of user packet bytes output from the received packet identification unit 411. In addition, the reception counter 412 notifies the reception control unit 413 of the accumulated number of user packet bytes. In addition, when a reset signal has been output from the reception control unit 413, the number-of-received-bytes calculation unit 1112 resets a count value to "0".

When having input the OAM packet 420 from the received packet identification unit 411, the reception control unit 413 calculates user packet loss information on the basis of the number of user packet bytes given notice of by the number-of-received-bytes calculation unit 1112 and a predetermined threshold value preliminarily set. The threshold value set in the reception control unit 413 and the threshold value set in the transmission control unit 402 are values equal to each other.

As the user packet loss information, the number of user packet loss bytes or a user packet loss rate may be cited. The number of user packet loss bytes is a difference between the threshold value and the number of user packet bytes given notice of by the reception counter 412. For example, it is assumed that the threshold value is 1 giga (G) bytes (=1000 mega (M) bytes) and the number of user packet bytes given notice of is 900 Mbytes. In this case, the number of user packet loss bytes turns out to be "the threshold value (1000 Mbytes)−the number of user packet bytes given notice of (900 Mbytes)=100 Mbytes".

In addition, the user packet loss rate is the proportion of the number of user packet loss bytes to the threshold value. For example, when it is assumed that the threshold value is 1000 Mbytes and the number of user packet bytes given notice of is 900 Mbytes, the user packet loss rate turns out to be "(1000−900)/1000=10%".

In addition, when having input the OAM packet 420 from the received packet identification unit 411, the reception control unit 413 outputs a reset signal to the reception counter 412.

Figure 12:
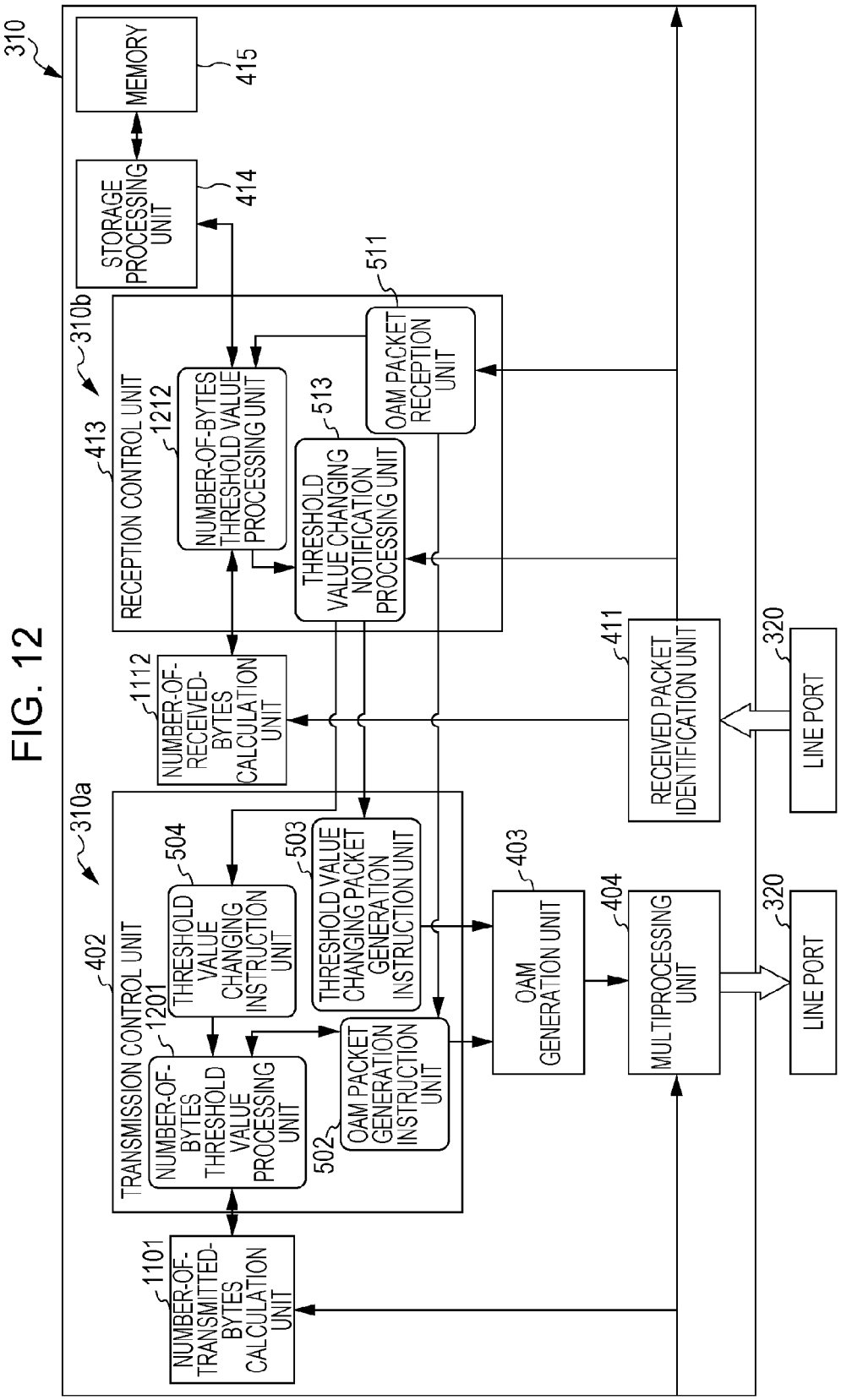
FIG. 12 is another explanatory diagram illustrating an example of another configuration of a communication unit.

FIG. 12 is another explanatory diagram illustrating an example of another configuration of a communication unit. In FIG. 12, the same symbol is assigned to the same configuration as the configuration illustrated in FIG. 5 or FIG. 11, and the description thereof will be omitted. As illustrated in FIG. 12, the transmission control unit 402 includes a number-of-bytes threshold value processing unit 1201.

The number-of-transmitted-bytes calculation unit 1101 accumulates the number of user packet bytes, and outputs the accumulated number of user packet bytes to the number-of-bytes threshold value processing unit 1201. When having input a reset signal from the number-of-bytes threshold value processing unit 1201, the number-of-transmitted-bytes calculation unit 1101 resets the accumulated number of user packet bytes.

In the number-of-bytes threshold value processing unit 1201, a threshold value (for example, 1 Gbytes=1000 Mbytes) for the number of user packet bytes is set. When the number of user packet bytes input from the number-of-transmitted-bytes calculation unit 1101 has reached the threshold value, the number-of-bytes threshold value processing unit 1201 outputs a signal indicating that effect, to the OAM packet generation instruction unit 502, and outputs the reset signal to the number-of-transmitted-bytes calculation unit 1101. When having input a changing signal from the threshold value changing instruction unit 504, the number-of-bytes threshold value processing unit 1201 changes the threshold value.

When the signal has been output from the number-of-bytes threshold value processing unit 1201, the OAM packet generation instruction unit 502 outputs a trigger signal to the OAM generation unit 403.

When having input a predetermined signal from the threshold value changing notification processing unit 513, the threshold value changing instruction unit 504 outputs the changing signal to the number-of-bytes threshold value processing unit 1201. The predetermined signal is, for example, an error signal indicating that the user packet loss rate does not fall within a predetermined range or a packet signal indicating that a threshold value changing packet has been input.

The reception control unit 413 includes a number-of-bytes threshold value processing unit 1212. When having input a signal from the received packet identification unit 411, the number-of-received-bytes calculation unit 1112 accumulates the number of user packet bytes, and notifies the number-of-bytes threshold value processing unit 1212 of the accumulated number of user packet bytes.

When having input the OAM packet 420 from the received packet identification unit 411, the OAM packet reception unit 511 outputs, to the OAM packet generation instruction unit 502 and the number-of-bytes threshold value processing unit 1212, a signal indicating that the OAM packet 420 has been input. When having input the signal from the OAM packet reception unit 511, the number-of-bytes threshold value processing unit 1212 calculates a user packet loss rate using the number of user packet bytes, accumulated by the number-of-bytes threshold value processing unit 1212, and a set threshold value (1000 Mbytes). In addition, the number-of-bytes threshold value processing unit 1212 output the calculated user packet loss rate to the storage processing unit 414 and the threshold value changing notification processing unit 513.

Even if such a configuration is adopted, it may be possible to detect the user packet loss information owing to simple processing. In addition, it may be possible to detect a data amount indicating how many bytes have been discarded on the network. In addition, in the same way as the processing operations illustrated in FIG. 9 and FIG. 10, it may also be possible to make measurement accuracy variable in response to the user packet loss information.

In addition, it may also be possible to adopt a configuration utilizing both of a configuration where the user packet loss information is detected from the number of user packet bytes and a configuration where the user packet loss information is detected from the number of user packets. By adopting such a configuration, it may become possible to detect the number of discarded packets and the number of discarded bytes, as the user packet loss information.

First Example of Modification to Embodiment

Next, a first example of a modification to the embodiment will be described. In the first example of a modification, a case will be described where a threshold value is set with respect to each class in each logical flow. In addition, in the first example of a modification, the same symbol is assigned to the same point as the point already described, and the description thereof will be omitted.

(Example of Table Expressing Threshold Value with Respect to Each Class in Each Logical Flow)

FIG. 13 is an explanatory diagram illustrating an example of a table expressing a threshold value with respect to each class in each logical flow. In a table 1300 illustrated in FIG. 13, a logical flow expresses a user. A class expresses a service type (quality). A threshold value expresses the number of outputs of the number of user packets, which serves as a condition for generating the OAM packet 420.

In the table 1300, the threshold values of individual classes are individually set with respect to each logical flow. For example, in the logical flow 1 of the table 1300, a class 1 has been put into "ON". A threshold value 1 corresponding to the class 1 has been set to "1000". In other words, it is indicated that, in the logical flow 1, the OAM packet 420 is generated when the number of user packets of the class 1 has reached the threshold value 1, "1000". In addition, for example, in a case where it is assumed that a class 2 has been put into "ON" and a threshold value corresponding to the class 2 is 500, when the number of user packets of the class 2 has reached the threshold value 2, "500", the OAM packet 420 turns out to be generated.

(Transmission Processing in Each Class with Respect to Each Logical Flow Communication Unit Performs)

Figure 14:
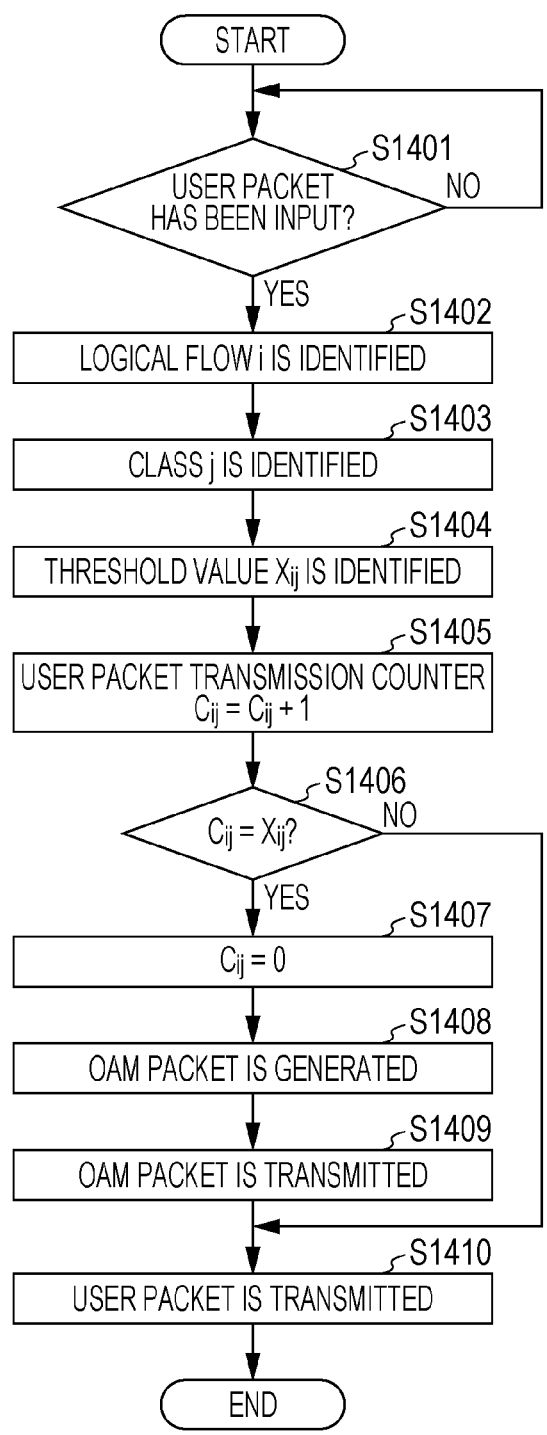
FIG. 14 is a flowchart illustrating an example of transmission processing in each class with respect to each logical flow a communication unit performs.

FIG. 14 is a flowchart illustrating an example of transmission processing in each class with respect to each logical flow a communication unit performs. As illustrated in FIG. 14, the communication unit 310 determines whether or not a user packet has been input (step S1401). The communication unit 310 waits until the user packet is input (step S1401: No). When the user packet has been input (step S1401: Yes), the communication unit 310 identifies "i" indicating one of "1 to n" of the logical flows, on the basis of the input user packet (step S1402).

Next, the communication unit 310 identifies "j" indicating one of classes "1 to m" of the logical flow "i", on the basis of the user packet input in the step S1401 (step S1403). Next, a threshold value "$X_{ij}$" corresponding to the class "j" of the logical flow "i" (step S1404). Next, the communication unit 310 increments the count value $C_{ij}$ of the transmission counter 401, which corresponds to the class "j" of the logical flow "i" (step S1405).

Next, the communication unit 310 determines whether or not the count value $C_{ij}$ is the threshold value $X_{ij}$ (for example, 1000) (step S1406). When the count value $C_{ij}$ is not the threshold value $X_{ij}$ (step S1406: No), the communication unit 310 transfers to a processing operation in a step S1410. When the count value $C_{ij}$ is the threshold value $X_{ij}$ (step S1406: Yes), the communication unit 310 resets the count value $C_{ij}$ to "0" (step S1407).

In addition, the communication unit 310 generates the OAM packet 420 corresponding to the class "j" of the logical flow "i" (step S1408). Next, the communication unit 310 multiplexes the OAM packet 420 with the user packet and transmits the OAM packet 420 (step S1409). Next, the communication unit 310 transmits the user packet (step S1410), and terminates a series of processing operations due to the present flowchart.

(Reception Processing in Each Class with Respect to Each Logical Flow Communication Unit Performs)

Figure 15:
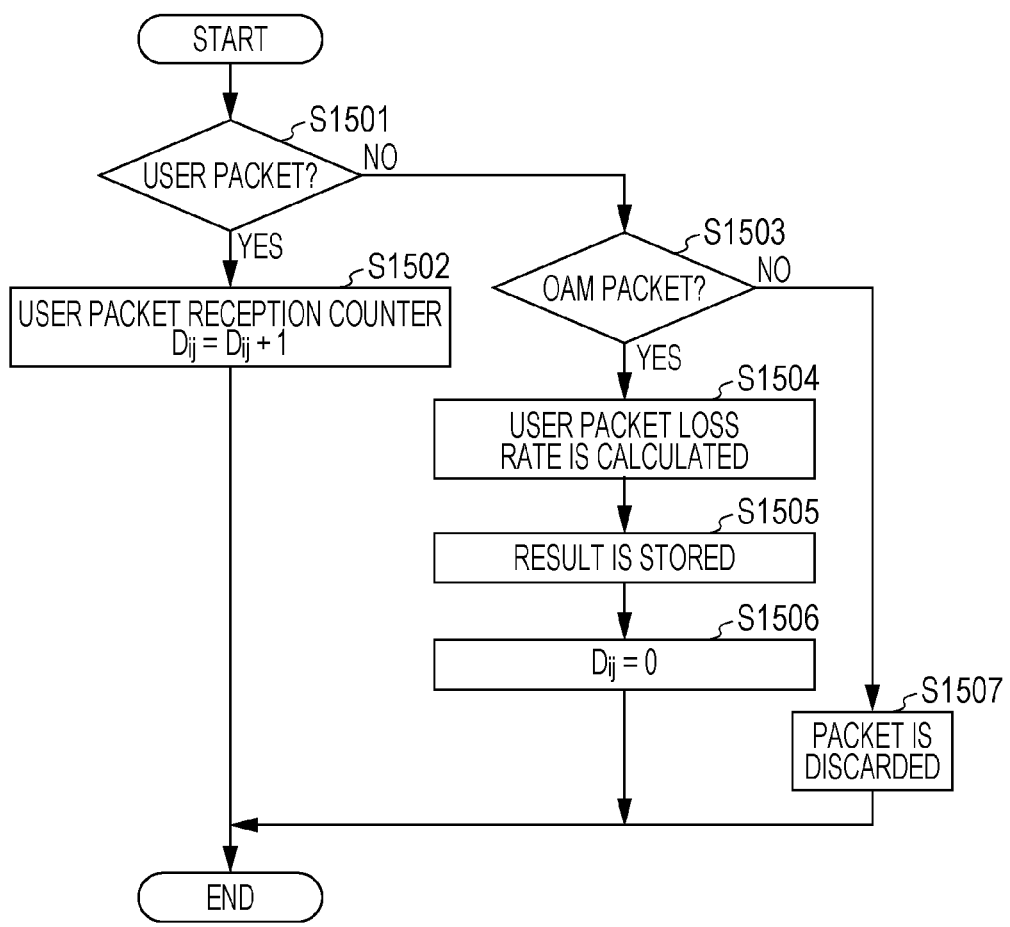
FIG. 15 is a flowchart illustrating an example of reception processing in each class with respect to each logical flow a communication unit performs.

FIG. 15 is a flowchart illustrating an example of reception processing in each class with respect to each logical flow a communication unit performs. As illustrated in FIG. 15, the communication unit 310 determines whether or not a received packet is a user packet (step S1501). When the received packet is the user packet (step S1501: Yes), the communication unit 310 increments the count value $D_{ij}$ of the reception counter 412, which corresponds to the class "j" of the logical flow "i", on the basis of the received user packet (step S1502), and terminates the processing.

When the received packet is not the user packet (step S1501: No), the communication unit 310 determines whether or not the received packet is the OAM packet 420 (step S1503). When the received packet is the OAM packet 420 (step S1503: Yes), the communication unit 310 calculates the user packet loss rate of the class "j" of the logical flow "i" on the basis that the received packet is the OAM packet 420 (step S1504).

Next, the communication unit 310 stores, in the memory 415, the user packet loss rate of the class "j" of the logical flow "i" (step S1505). In addition, the communication unit 310 resets, to "0", the count value $D_{ij}$ of the reception counter 412, which corresponds to the class "j" of the logical flow "i" (step S1506), and terminates a series of processing operations due to the present flowchart.

When, in the step S1503, the received packet is not the OAM packet 420 (step S1503: No), the communication unit 310 discards the packet (step S1507), and terminates a series of processing operations due to the present flowchart.

According to the first example of a modification, it may be possible to set an individual threshold value with respect to each service type of each user, and it may be possible to measure the user packet loss information with respect to each service type, using a simple configuration. In addition, it may also be possible to set threshold values 1 to m with respect to the logical flows 1 to n, respectively. In addition, according to such a configuration, it may be possible to set a threshold value with respect to each user, and it may be possible to measure the user packet loss information with respect to each user. Accordingly, it may be possible to efficiently measure a transmission path with respect to each service type.

In addition, in the first example of a modification, it may also be possible to make the measurement accuracy of the user packet loss information of each class variable on the basis of the user packet loss information with respect to each class. By doing this, it may be possible to measure the user packet loss information in accordance with the user packet loss rate with respect to each class.

Second Example of Modification to Embodiment

Next, a second example of a modification to the embodiment will be described. In the second example of a modification, a case will be described where the OAM packet 420 to which a sequence number is assigned is transmitted. In addition, in the second example of a modification, the same symbol is assigned to the same point as the point already described, and the description thereof will be omitted.

(Example of Configuration of Memory)

Figure 16:
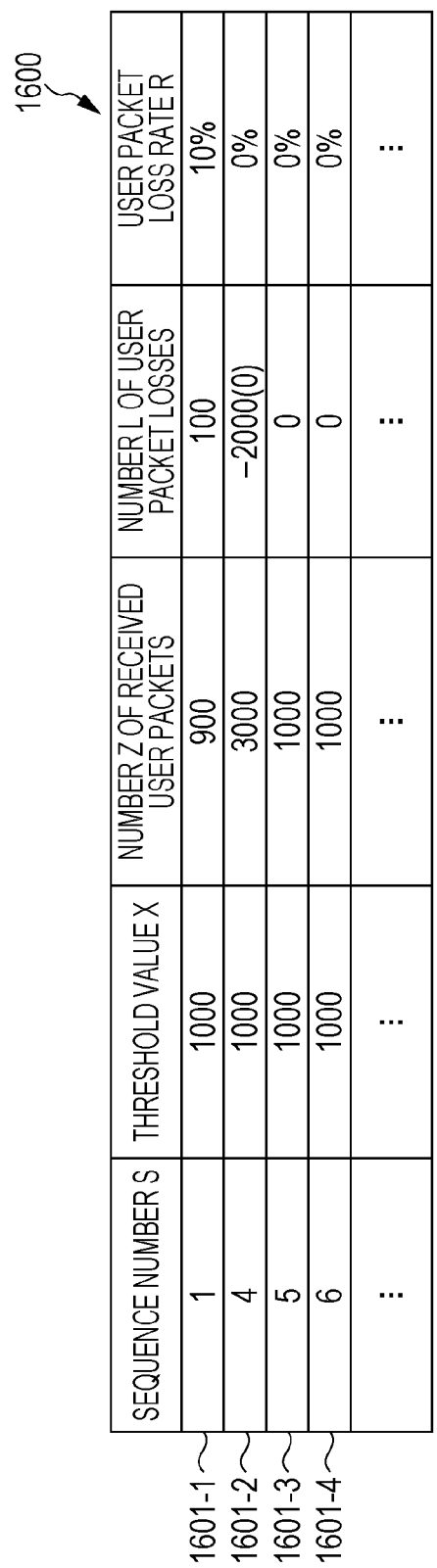
FIG. 16 is an explanatory diagram illustrating an example of a configuration of a memory.

FIG. 16 is an explanatory diagram illustrating an example of the configuration of a memory. A database 1600 illustrated in FIG. 16 is stored in the memory 415. The database 1600 includes a sequence number field, a threshold value field, a number-of-received-user-packets field, a number-of-user-packet-losses field, and a user packet loss rate field.

Using a serial number, a sequence number S expresses the number of times the OAM packet 420 has been transmitted from the communication unit 310*a*. In the sequence number field, this serial number is stored. In the threshold value field, a threshold value X is stored every sequence number or more. Using the number of times a user packet is transmitted, the threshold value X expresses an interval at which the OAM packet 420 is transmitted. For example, a threshold value of 1000 expresses that the transmission interval of the OAM packet 420 corresponds to an interval at which a user packet is transmitted 1000 times.

In the number-of-received-user-packets field, the number Z of counts (count value) of user packets when the communication unit 310 has received the OAM packet 420 is stored. In the number-of-user-packet-losses field, user packet loss information is stored that is obtained by subtracting the number-of-received-user-packets field from a value stored in the threshold value field. In the user packet loss rate field, user packet loss information is stored that expresses the proportion of the number L of user packet losses to the threshold value.

By setting information in each field, in the database 1600, packet information 1601 with respect to each combination of the sequence number S, the threshold value X, the number Z of received user packets, the number L of user packet losses, and the user packet loss rate R is stored as a record.

Packet information 1601-1 will be cited as an example and described. In the packet information 1601-1, the sequence number S is "1", the threshold value X is "1000", the number Z of received user packets is "900", the number L of user packet losses is "100", and the user packet loss rate R is "10%". The number L of user packet losses, "100", expresses a value obtained by subtracting the number Z of received user packets, "900", from the threshold value X, "1000". The user packet loss rate R, "10%", expresses "the number L of user packet losses (100)/the threshold value X (1000)=10%".

In addition, in packet information 1601-2, the sequence number S is "4", the threshold value X is "1000", the number Z of received user packets is "3000", the number L of user packet losses is "−2000", and the user packet loss rate R is "0%". The number L of user packet losses, "−2000" is a value obtained by subtracting the number Z of received user packets, "3000", from the threshold value X, "1000". Here, in the sequence number field, after the sequence number S, "1", has been stored, the sequence number S, "2 or 3", is not stored in a time period before the sequence number S, "4", is stored. In other words, it is expressed that the numbers Z of received user packets, which individually correspond to the sequence numbers S, "2 and 3", have slipped out.

Here, a value obtained by subtracting the previous sequence number S, "1", from the sequence number S, "4", expresses an interval that has slipped out. In other words, it is expressed that three periods calculated owing to "4−1=3" have slipped out. A threshold value for three periods is "1000×3=3000".

The number Z of received user packets expresses "3000". In other words, it is expressed that the number Z of received user packets has been counted to "3000" during three periods. Actually, the number L of user packet losses is not "−2000" but a value, "0", obtained by subtracting the number Z of received user packets, "3000", from the threshold value X, "3000", for three periods, as illustrated in parentheses in FIG. 16. Accordingly, the user packet loss rate R also becomes "0%".

(Example of Format of 1SL-Based OAM Frame)

Figure 17:
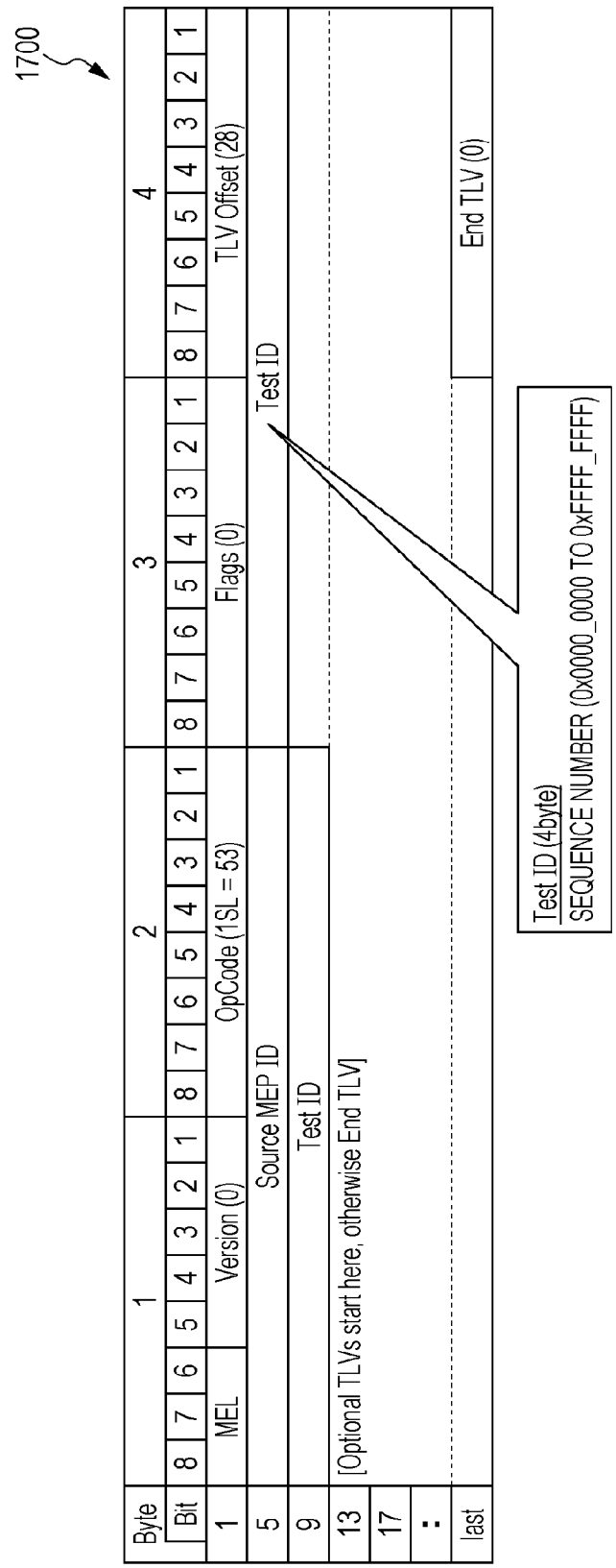
FIG. 17 is an explanatory diagram illustrating an example of a format of a 1SL-based OAM frame.

Next, an example of the format of a 1SL-based OAM frame will be described. FIG. 17 is an explanatory diagram illustrating an example of the format of a 1SL-based OAM frame. In addition, the 1SL is a measurement method for a packet loss, which is capable of calculating how many 1SL packets within a network have been lost in a measurement section and broadly measuring transmission quality. As illustrated in FIG.

17, an OAM frame 1700 includes Test ID. In the Test ID, for example, the data of the sequence number S (refer to FIG. 16) including 4 Bytes is stored.

(Transmission Processing Communication Unit According to Second Example of Modification to Embodiment Performs)

Figure 18:
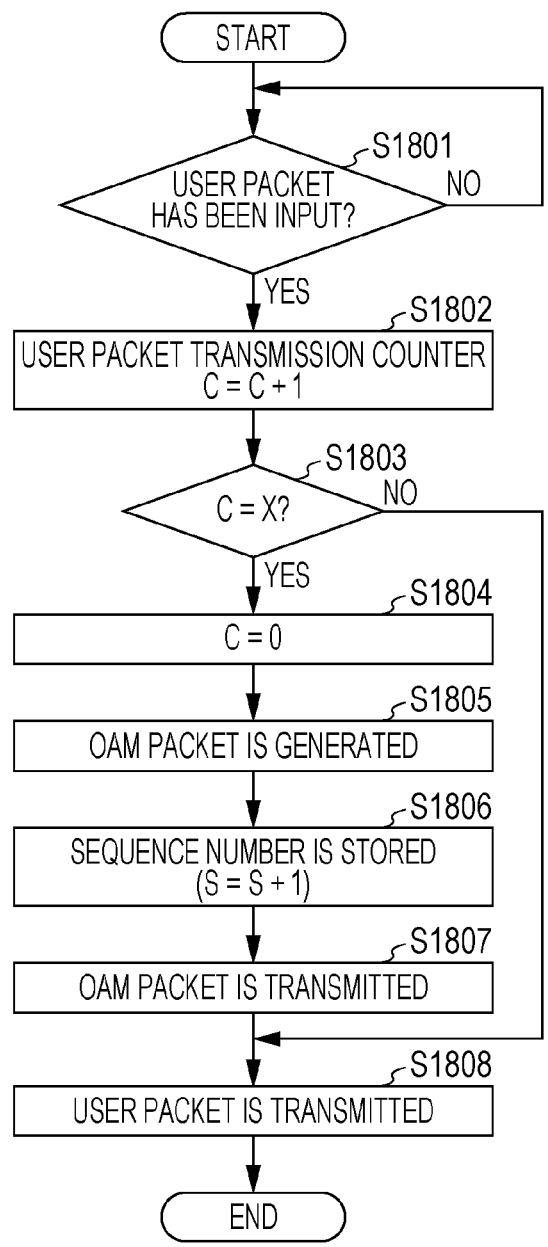
FIG. 18 is a flowchart illustrating an example of transmission processing a communication unit according to a second example of a modification performs.

FIG. 18 is a flowchart illustrating an example of transmission processing a communication unit according to a second example of a modification performs. As illustrated in FIG. 18, the communication unit 310 determines whether or not a user packet has been input (step S1801). The communication unit 310 waits until the user packet is input (step S1801: No). When having input the user packet (step S1801: Yes), the communication unit 310 increments the count value C of the transmission counter 401 (step S1802).

Next, the communication unit 310 determines whether or not the count value C is the threshold value X (for example, 1000) (step S1803). When the count value C is not the threshold value X (step S1803: No), the communication unit 310 transfers to a processing operation in a step S1808. When the count value C is the threshold value X (step S1803: Yes), the communication unit 310 resets the count value C to "0" (step S1804).

In addition, the communication unit 310 generates the OAM packet 420 (step S1805). Next, the incremented sequence number S is caused to be stored in the OAM packet 420 (step S1806). Next, the communication unit 310 multiplexes the OAM packet 420 with the user packet and transmits the OAM packet 420 (step S1807). Next, the communication unit 310 transmits the user packet (step S1808), and terminates a series of processing operations due to the present flowchart.

(Reception Processing Communication Unit According to Second Example of Modification Performs)

Figure 19:
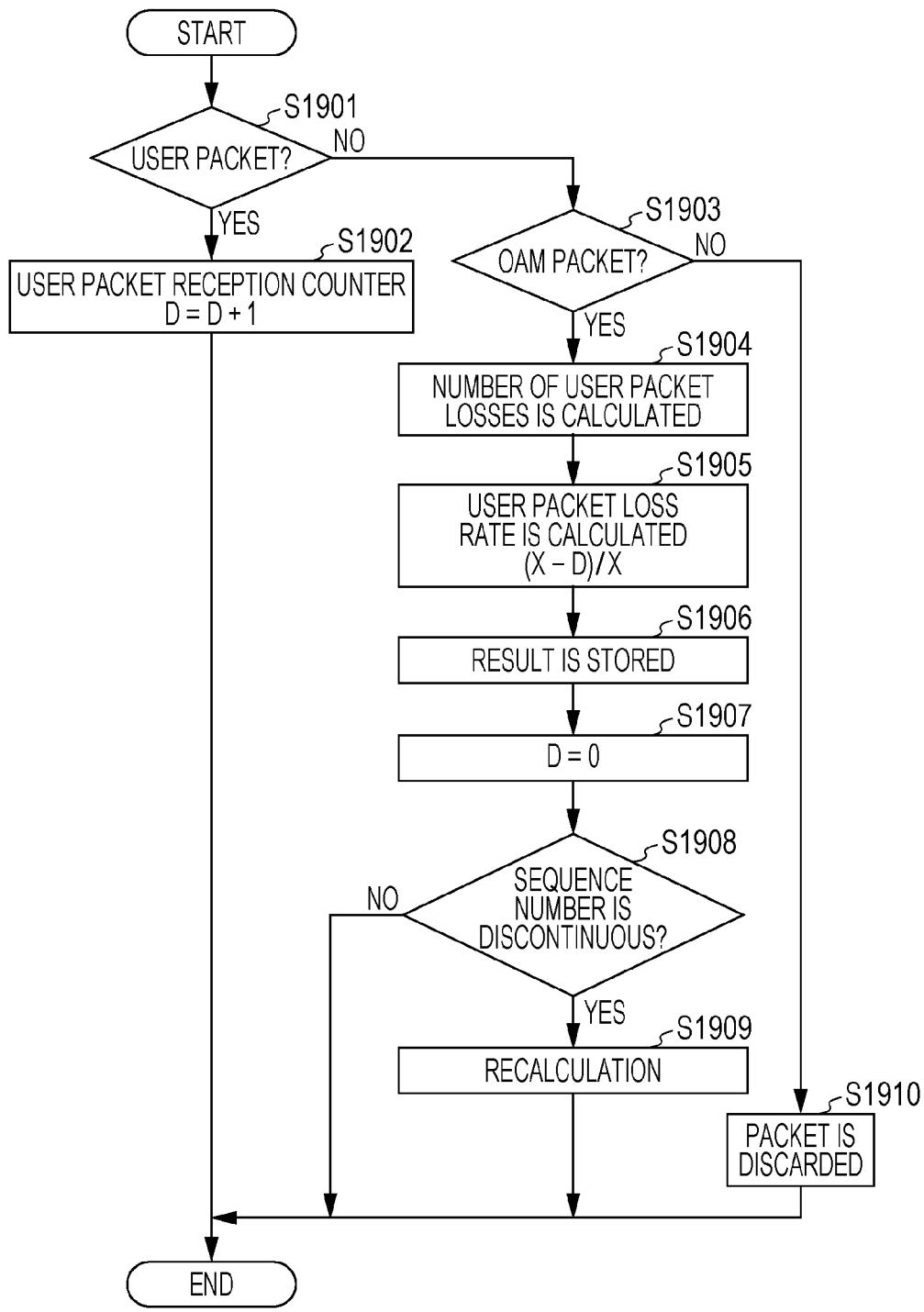
FIG. 19 is a flowchart illustrating an example of reception processing a communication unit according to the second example of a modification performs.

FIG. 19 is a flowchart illustrating an example of reception processing the communication unit according to the second example of a modification performs. As illustrated in FIG. 19, the communication unit 310 determines whether or not a received packet is a user packet (step S1901). When the received packet is the user packet (step S1901: Yes), the communication unit 310 increments the count value D of the reception counter 412 (step S1902), and terminates a series of processing operations.

When the received packet is not the user packet (step S1901: No), the communication unit 310 determines whether or not the received packet is the OAM packet 420 (step S1903). When the received packet is the OAM packet 420 (step S1903: Yes), the communication unit 310 calculates the number L of user packet losses (step S1904). In addition, the communication unit 310 calculates the user packet loss rate R (step S1905).

Next, in the memory 415, the communication unit 310 stores the sequence number S, the threshold value X, the number Z of received user packets, the number L of user packet losses, and the user packet loss rate R (step S1906). Next, the communication unit 310 resets the count value D of the reception counter to "0" (step S1907).

Next, the communication unit 310 determines whether or not the sequence number S is discontinuous (step S1908). When the sequence number S is continuous (step S1908: No), the communication unit 310 terminates a series of processing operations due to the present flowchart. When the sequence number S is discontinuous (step S1908: Yes), the communication unit 310 calculates periods having slipped out, calculates a threshold value for the periods, recalculate the number L of user packet losses and the user packet loss rate R (step S1909), and terminates a series of processing operations due to the present flowchart.

When, in the step S1903, the received packet is not the OAM packet 420 (step S1903: No), the communication unit 310 discards the packet (step S1910), and terminates a series of processing operations due to the present flowchart.

In this way, in the second example of a modification, the OAM packet 420 storing therein the sequence number S is used, and hence, with taking into consideration a time period during which the OAM packet 420 has not been received, it may be possible to calculate the user packet loss information. Accordingly, it may be possible to enhance the measurement accuracy of a transmission path, and it may be possible to more efficiently measure the transmission path.

Third Example of Modification to Embodiment

Next, a third example of a modification to the embodiment will be described. In the third example of a modification, a case will be described where switching between measurement methods for packet losses is performed. In the third example of a modification, the same symbol is assigned to the same point as the point already described, and the description thereof will be omitted.

(Another Example of Format of 1SL-Based OAM Frame)

Figure 20:
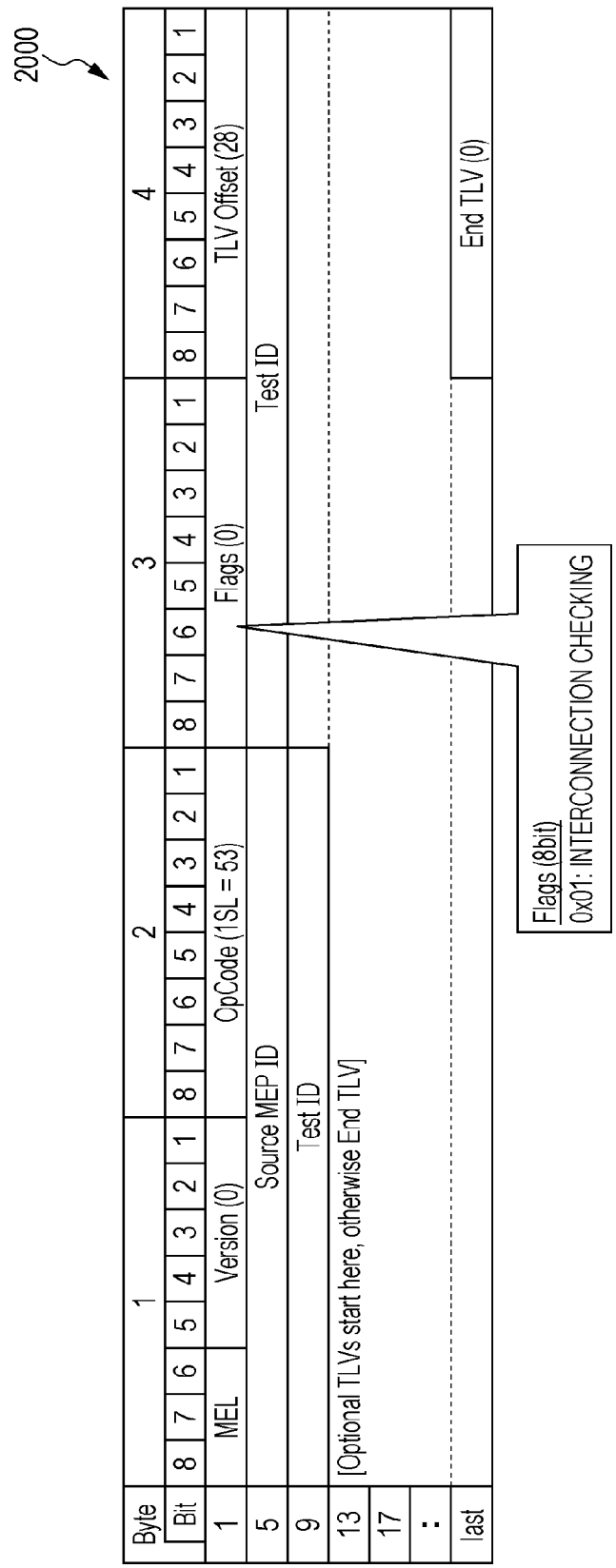
FIG. 20 is an explanatory diagram illustrating another example of a format of a 1SL-based OAM frame.

FIG. 20 is an explanatory diagram illustrating another example of the format of a 1SL-based OAM frame. In FIG. 20, the description of the point described in the format of the OAM frame in FIG. 17 will be omitted. As illustrated in FIG. 20, the Flags of an OAM frame 2000 includes data used for interconnection checking. The data used for interconnection checking is data used for confirming whether or not the other end performing communication has a function of performing, for example, the reception processing illustrated in FIG. 10.

(Transmission Processing when Switching Between Measurement Methods is Performed)

Figure 21:
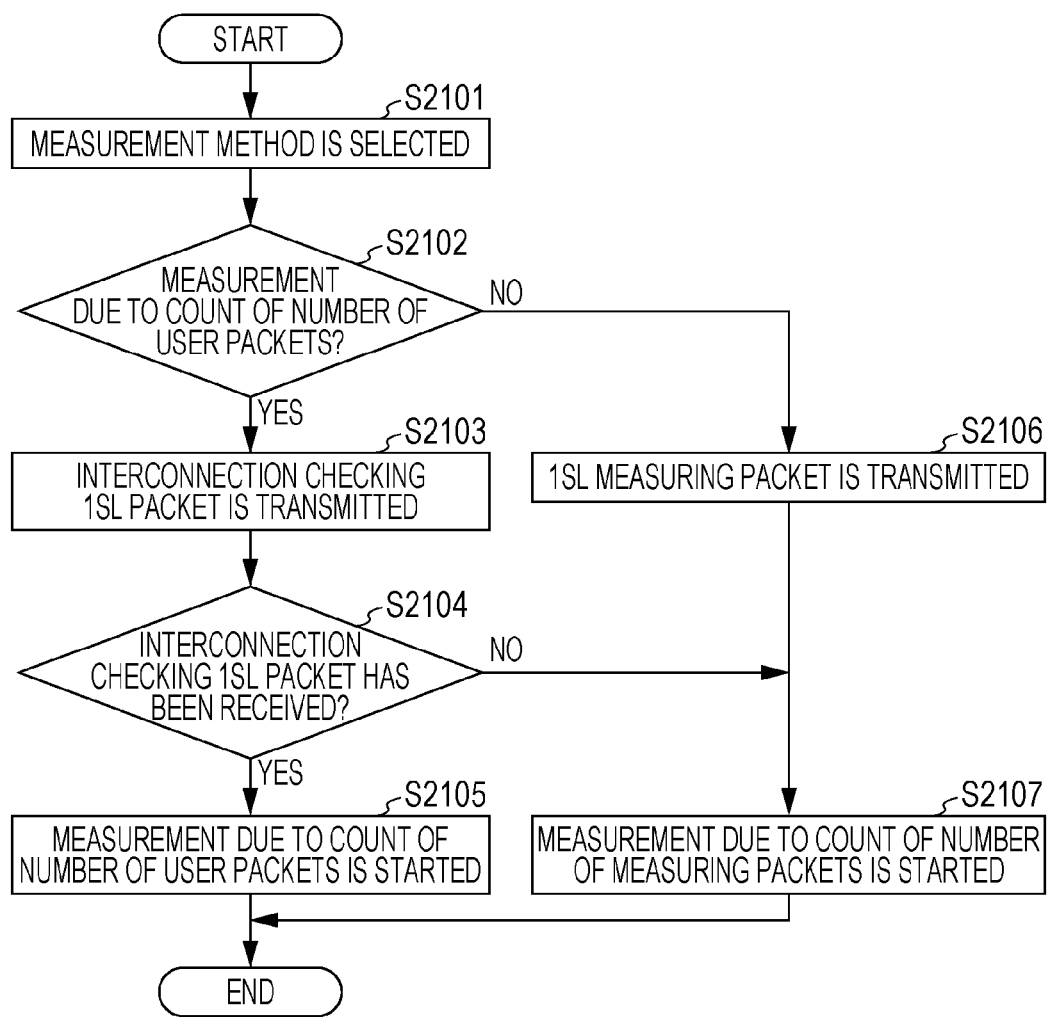
FIG. 21 is a flowchart illustrating an example of transmission processing when switching between measurement methods is performed.

FIG. 21 is a flowchart illustrating an example of transmission processing when switching between measurement methods is performed. As illustrated in FIG. 21, the communication unit 310 selects a measurement method (step S2101). The selection of a measurement method is arbitrarily set. For example, the selection of a measurement method is due to the presence or absence of a measuring function due to the count of the number of user packets, due to user selection, or based on the congestion state of a line. Next, the communication unit 310 determines whether or not the result of the selection of a measurement method in the step S2101 is the measurement due to the count of the number of user packets (step S2102). Specifically, the measurement due to the count of the number of user packets is the measurement of packet losses illustrated in FIG. 9 and FIG. 10.

In the case of the measurement due to the count of the number of user packets (step S2102: Yes), the communication unit 310 transmits an interconnection checking 1SL packet including interconnection checking data (refer to FIG. 20) (step S2103). Next, the communication unit 310 determines whether or not the interconnection checking 1SL packet has been received (step S2104). When the interconnection checking 1SL packet has been received (step S2104: Yes), the communication unit 310 starts the measurement due to the count of the number of user packets (step S2105), and terminates a series of processing operations due to the present flowchart.

When, in the step S2102, the result of the selection of a measurement method is not the measurement due to the count of the number of user packets (step S2102: No), a 1SL measuring packet is transmitted (step S2106). Next, the communication unit 310 starts measurement due to the count of the number of measuring packets (step S2107), and terminates a series of processing operations.

Specifically, the measurement due to the count of the number of measuring packets is the measurement of packet losses, performed owing to the 1SL packet of the ITU-T Y.1731 standard. When, in the step S2104, the interconnection checking 1SL packet is not received (step S2104: No), the communication unit 310 transfers to the step S2107, starts the measurement due to the count of the number of measuring packets, and terminates a series of processing operations.

(Reception Processing when Switching Between Measurement Methods is Performed)

Figure 22:
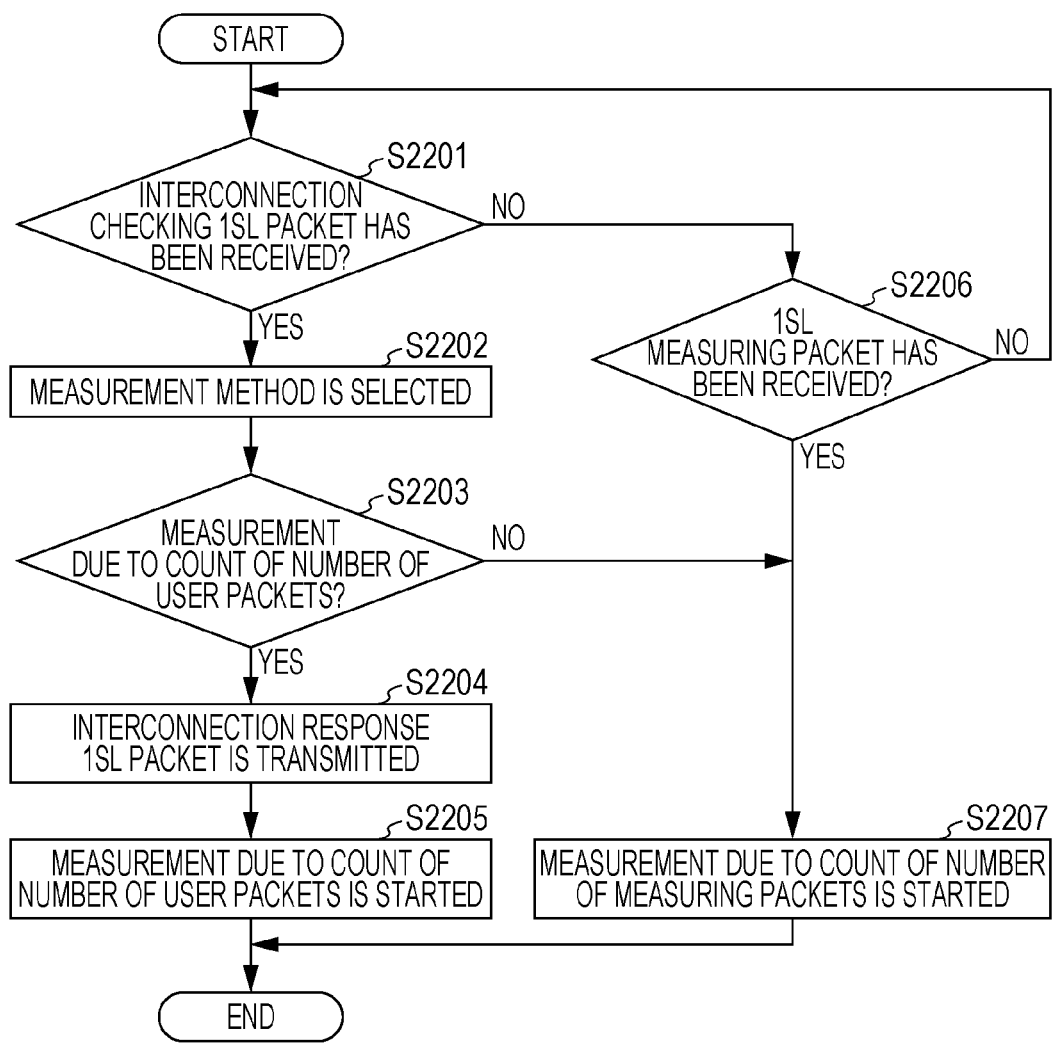
FIG. 22 is a flowchart illustrating an example of reception processing when switching between measurement methods is performed.

FIG. 22 is a flowchart illustrating an example of reception processing when switching between measurement methods is performed. As illustrated in FIG. 22, the communication unit 310 determines whether or not the interconnection checking 1SL packet including the interconnection checking data (refer to FIG. 20) has been received (step S2201). When having received the interconnection checking 1SL packet (step S2201: Yes), the communication unit 310 selects a measurement method (step S2202).

The selection of a measurement method is arbitrarily set. For example, the selection of a measurement method is due to the presence or absence of a measuring function due to the count of the number of user packets, due to user selection, or based on the congestion state of a line. Next, the communication unit 310 determines whether or not the result of the selection of a measurement method in the step S2202 is the measurement due to the count of the number of user packets (step S2203).

In the case of the measurement due to the count of the number of user packets (step S2203: Yes), the communication unit 310 transmits an interconnection response 1SL packet (step S2204). In addition, the communication unit 310 starts the measurement due to the count of the number of user packets (step S2205), and terminates a series of processing operations due to the present flowchart. When, in the step S2201, the interconnection checking 1SL packet is not received (step S2201: No), it is determined whether or not the 1SL measuring packet has been received (step S2206).

The 1SL measuring packet is transmitted when the measurement due to the count of the number of measuring packets is selected in the communication unit 310 on a transmitting side or when the communication unit 310 on the transmitting side only has this measuring function. When the 1SL measuring packet is not received (step S2206: No), the communication unit 310 returns to the step S2201, and waits for the reception of a packet from the communication unit 310 serving as a transmission source.

When the 1SL measuring packet has been received (step S2206: Yes), the communication unit 310 starts the measurement due to the count of the number of measuring packets (the measurement of packet losses, performed owing to the 1SL packet of the ITU-T Y.1731 standard) (step S2207), and terminates the processing. In addition, when, in the step S2203, the result of the selection of a measurement method is not the measurement due to the count of the number of user packets (step S2203: No), the communication unit 310 transfers to the step S2207.

According to the processing operations illustrated in FIG. 21 and FIG. 22, in response to the function of the communication unit 310 of the other end connected, it may be possible to perform switching between the measurement of packet losses, which is illustrated in FIG. 9 and FIG. 10 and utilizes the OAM packet 420, and the measurement of packet losses, performed owing to the 1SL packet. In addition, using only one type of line, it may be possible to perform two types of transmission path measurement.

(Measurement Method for Packet Loss, Performed Owing to 1SL Packet)

Figure 23:
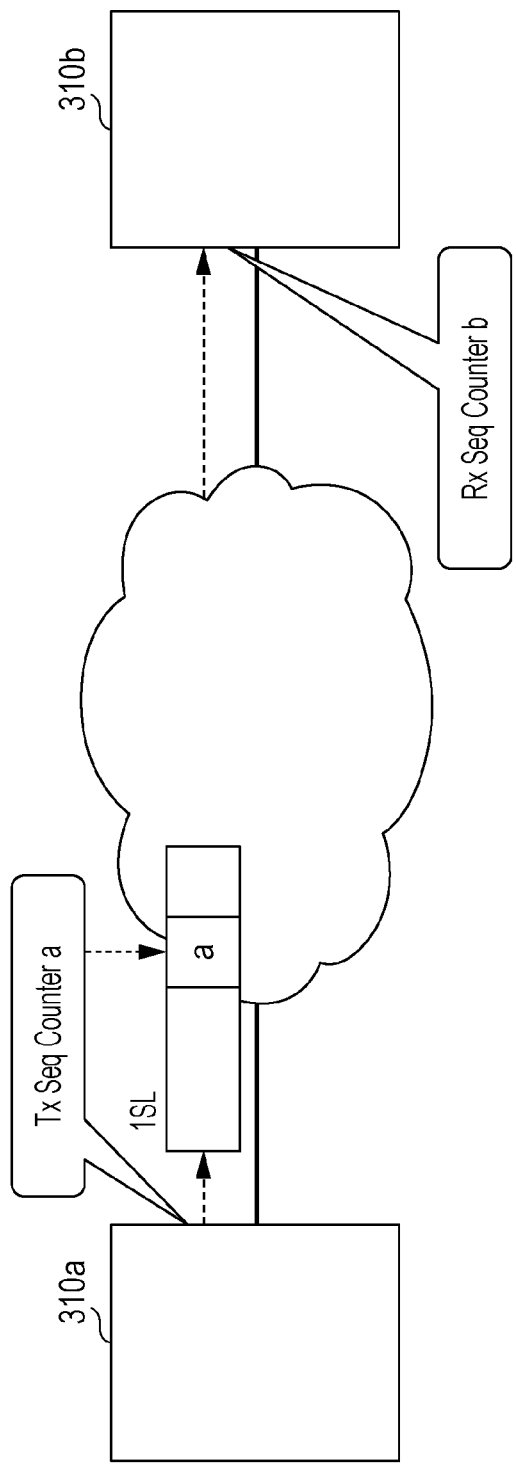
FIG. 23 is an explanatory diagram illustrating an example of a measurement method for a packet loss, performed owing to a 1SL packet.

Next, using FIG. 23, a measurement method for a packet loss will be described that is performed owing to a 1SL packet. FIG. 23 is an explanatory diagram illustrating an example of a measurement method for a packet loss, performed owing to a 1SL packet. As illustrated in FIG. 23, the communication unit 310a in the communication device 101 on the transmitting side inserts, into the 1SL packet, the transmission count value (TxSeqf) of the 1SL packet, and transmits the 1SL packet to the communication unit 310b in the communication device 101 on the receiving side with a transmit period of 100 ms, 1 s, or 10 s.

After having received the 1SL, the communication unit 310b holds therewithin the reception count value (RxSeql) of the 1SL. The communication unit 310b calculates the number of user packet losses using the following Expression (1) defined in the ITU-T Y.1731 standard.

$$\text{Frame Loss}_{near-end} = |TxSeqf[tc] - TxSeqf[tp]| - |RxSeql[tc] - RxSeql[tp]| \quad (1)$$

tc: End time of the measurement period
tp: Start time of the measurement period (Example of 1SL Packet Format)

Figure 24:
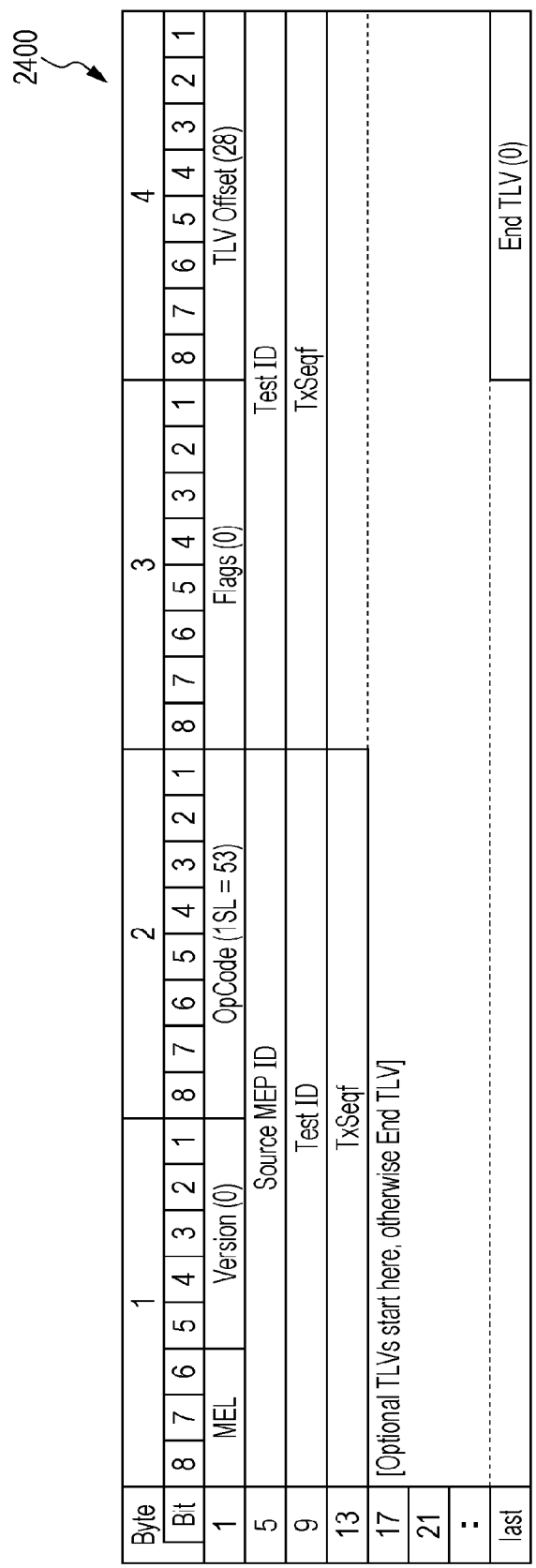
FIG. 24 is an explanatory diagram illustrating an example of a 1SL packet format.

FIG. 24 is an explanatory diagram illustrating an example of a 1SL packet format. A 1SL packet format 2400 illustrated in FIG. 24 includes pieces of data such as, for example, MEL, Version, OpCode, Flags, TLV Offset, Source MEP ID, Test ID, TxSeqf, and End TLV. The 1SL packet format 2400 is different from the above-mentioned OAM frame 701 (refer to FIG. 8A) in that the 1SL packet format 2400 includes the Test ID and the TxSeqf.

A packet loss measurement method utilizing the 1SL is a method for detecting transmission quality from the transmission or reception number of only the 1SL packets, and is not a method for detecting the number of user packet losses itself. Since the packet loss measurement method utilizing the 1SL only measures the 1SL packet, the circuit size thereof may be small, and it may be possible to reduce a cost.

On the other hand, in the measurement due to the count of the number of user packets (the measurement is illustrated in FIG. 9 and FIG. 10 and utilizes the OAM packet 420), it may be possible to measure a packet loss owing to a simple configuration and simple processing. In addition, in the measurement due to the count of the number of user packets, since it may be possible to detect the number of user packet losses itself, it may be possible to obtain a highly-reliable measurement result. In this way, in the measurement due to the count of the number of user packets, it may be possible to efficiently measure a transmission path.

In this way, switching between measurement methods is performed, and hence, using one type of line, it may be possible to perform two types of transmission path measurement. In addition, if switching between measurement methods is performed in response to a line state, it may be possible to measure a transmission path with reducing a load on a whole circuit. In addition, if switching between measurement methods is performed in response to user selection, it may be possible to perform measurement reflecting the intention of a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a first communication device configured to transmit input data to a transmission path, detect a first accumulated amount of the input data, and transmit notifying data to the transmission path when the detected first accumulated amount has reached a threshold value; and
    a second communication device configured to receive data transmitted to the transmission path by the first communication device, detect a second accumulated amount of the received data, and output measurement information based on the detected second accumulated amount and the threshold value when having received the notifying data, wherein
    the first communication device resets the first accumulated amount when the first accumulated amount has reached the threshold value, and
    the second communication device resets the second accumulated amount when having received the notifying data.

2. The communication system according to claim 1, wherein
    the first communication device is configured to switch between a state of transmitting the notifying data to the transmission path when the first accumulated amount has reached the threshold value and a state of periodically transmitting measuring data to the transmission path, and
    when having received the measuring data, the second communication device switches from a state of outputting measurement information based on the second accumulated amount and the threshold value to a state of outputting measurement information based on an accumulated amount of the received measuring data.

3. The communication system according to claim 1, wherein the second communication device outputs the measurement information including a loss amount of data, the loss amount of data being calculated on the basis of the detected second accumulated amount and the threshold value.

4. The communication system according to claim 1, wherein
    the first accumulated amount is the accumulated number of the input data, and
    the second accumulated amount is the accumulated number of the received data.

5. The communication system according to claim 1, wherein
    the first accumulated amount is an accumulated data amount of the input data, and
    the second accumulated amount is an accumulated data amount of the received data.

6. The communication system according to claim 1, wherein
    the first communication device receives the measurement information from the second communication device, and changes the threshold value on the basis of the received measurement information, and
    the second communication device changes the threshold value on the basis of the measurement information.

7. The communication system according to claim 6, wherein
    the first communication device sets the threshold value to a first value when a loss amount of data, based on the measurement information, is a first loss amount, and sets the threshold value to a second value smaller than the first value when the loss amount is a second loss amount larger than the first loss amount, and
    the second communication device sets the threshold value to the first value when a loss amount of data, based on the measurement information, is the first loss amount, and sets the threshold value to the second value when the loss amount is the second loss amount.

8. The communication system according to claim 1, wherein
    the first communication device sets the threshold value with respect to each user of the input data, detects the first accumulated amount of the input data with respect to the user, and transmits the notifying data on a user where the detected first accumulated amount has reached the threshold value, and
    the second communication device detects the second accumulated amount with respect to the user, and outputs measurement information based on the second accumulated amount detected with respect to a user corresponding to the notifying data and the threshold value of the user corresponding to the notifying data when having received the notifying data.

9. The communication system according to claim 1, wherein
    the first communication device sets the threshold value with respect to each service type of the input data, detects an accumulated amount of the input data with respect to the service type, and transmits the notifying data on a service type where the detected first accumulated amount has reached the threshold value, and
    the second communication device detects the second accumulated amount with respect to the service type, and outputs measurement information based on the second accumulated amount detected with respect to a service type corresponding to the notifying data and the threshold value of the service type corresponding to the notifying data when having received the notifying data.

10. The communication system according to claim 1, wherein
    the first communication device transmits notifying data to which successive pieces of identification information are assigned, and
    the second communication device outputs the measurement information based on a difference between first identification information and second identification information, the threshold value, and the second accumulated amount when the first identification information assigned to the received notifying data is not continuous from the second identification information assigned to the previously received notifying data.

11. A communication device comprising:
    an interface configured to input data;
    a counter configured to detect a first accumulated amount of the data input by the interface; and
    a transmitter configured to transmit, to a transmission path, the data input by the interface, and transmit notifying data to the transmission path when the first accumulated amount detected by the counter has reached a threshold value, wherein the communication device resets the first accumulated amount when the first accumulated amount has reached the threshold value, the transmitter is configured to switch between a first state of transmitting the notifying data to the transmission path when the first accumulated amount has reached the threshold value and a second state of periodically transmitting measuring data to the transmission path, and to transmit, to a communication device serving as a transmission destination due to the transmission path, a signal inquiring whether or not it is possible to measure the transmission path on the basis of the notifying data, and switch to the first state or the second state in response to a response from the communication device.

12. The communication device according to claim 11, wherein the transmitter transmits the data and the notifying data to a communication device configured to receive the data transmitted to the transmission path, detect a second accumulated amount of the received data, and output measurement information based on the detected second accumulated amount and the threshold value when having received the notifying data.

13. A communication device comprising:

an interface configured to receive data from a transmission path;

a counter configured to detect a first accumulated amount of the data received by the interface; and a transmitter configured to output measurement information based on an accumulated amount detected by the counter and a set threshold value when the interface has received notifying data, wherein the communication device resets the first accumulated amount when the interface receives the notifying data, the transmitter is configured to switch between a first state of outputting measurement information based on the first accumulated amount and the threshold value and a second state of outputting measurement information based on an accumulated amount of measuring data periodically transmitted by a communication device serving as a transmission source of the transmission path, and switch to the first state when the interface has received information indicating that it is possible to transmit the notifying data from the communication device to the transmission path when an accumulated amount of data transmitted to the transmission path has reached the threshold value.

14. The communication device according to claim 13, wherein the interface receives data from a communication device configured to transmit input data to the transmission path, detects a second accumulated amount of the input data, and transmits the notifying data to the transmission path when the detected second accumulated amount has reached the threshold value.

15. A communication method, comprising:

transmitting, by a first communication device, input data to a transmission path;

detecting, by the first communication device, a first accumulated amount of the input data;

transmitting, by the first communication device, notifying data to the transmission path when the detected first accumulated amount has reached a threshold value;

receiving, by a second communication device, data transmitted to the transmission path by the first communication device;

detecting, by the second communication device, a second accumulated amount of the received data; and outputting, by the second communication device, measurement information based on the detected second accumulated amount and the threshold value when having received the notifying data, wherein the first communication device resets the first accumulated amount when the first accumulated amount has reached the threshold value, and the second communication device resets the second accumulated amount when having received the notifying data.

* * * * *